(12) United States Patent
Maeda et al.

(10) Patent No.: US 10,896,250 B2
(45) Date of Patent: Jan. 19, 2021

(54) BIOMETRIC AUTHENTICATION APPARATUS AND BIOMETRIC AUTHENTICATION METHOD

(71) Applicant: FUJITSU LIMITED, Kawasaki (JP)

(72) Inventors: Satoshi Maeda, Atsugi (JP); Yukihiro Abiko, Kawasaki (JP); Soichi Hama, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 16/258,805

(22) Filed: Jan. 28, 2019

(65) Prior Publication Data
US 2019/0236252 A1 Aug. 1, 2019

(30) Foreign Application Priority Data

Jan. 30, 2018 (JP) ................................ 2018-013203

(51) Int. Cl.
G06F 21/32 (2013.01)
G06K 9/00 (2006.01)
G06F 3/0488 (2013.01)

(52) U.S. Cl.
CPC ............ *G06F 21/32* (2013.01); *G06F 3/0488* (2013.01); *G06K 9/00013* (2013.01); *G06K 9/00087* (2013.01); *G06K 9/00912* (2013.01); *G06K 2009/00932* (2013.01)

(58) Field of Classification Search
None
See application file for complete search history.

(56) References Cited

U.S. PATENT DOCUMENTS

| | | | |
|---|---|---|---|
| 2007/0098223 A1* | 5/2007 | Kamata | G06K 9/00912 382/115 |
| 2013/0243264 A1 | 9/2013 | Aoki | |
| 2015/0067824 A1* | 3/2015 | Chatterton | G06F 3/04842 726/19 |
| 2015/0161836 A1* | 6/2015 | Park | B60R 25/2045 340/5.51 |

(Continued)

FOREIGN PATENT DOCUMENTS

| | | |
|---|---|---|
| EP | 2830002 A2 | 1/2015 |
| EP | 3070631 A1 | 9/2016 |

(Continued)

OTHER PUBLICATIONS

EESR—Extended European Search Report dated Jun. 26, 2019 for corresponding European Patent Application No. 19153703.4.

*Primary Examiner* — Mohammed Rachedine
(74) *Attorney, Agent, or Firm* — Fujitsu Patent Center

(57) ABSTRACT

A biometric authentication apparatus includes an imaging device, a display device, a memory, and a processor configured to display, on a screen of the display device, a guidance indicating a target area to be in contact with a part of a human body, detect whether the part of the human body is in contact with the target area, when the part of the human body is in contact with the target area, determine a distance between the imaging device and another part of the human body in accordance with an image captured by the imaging device, the image including the other part of the human body, and perform a change of a display position of the guidance in accordance with the determined distance.

13 Claims, 27 Drawing Sheets

(56) References Cited

U.S. PATENT DOCUMENTS

| | | |
|---|---|---|
| 2016/0275334 A1 | 9/2016 | Hama et al. |
| 2016/0292525 A1* | 10/2016 | Aoki ................. G06K 9/00033 |
| 2016/0328597 A1 | 11/2016 | Abiko et al. |
| 2017/0147863 A1 | 5/2017 | Semba et al. |
| 2017/0220841 A1 | 8/2017 | Maeda et al. |
| 2019/0392422 A1* | 12/2019 | Yim ................. G06Q 20/40145 |

FOREIGN PATENT DOCUMENTS

| | | |
|---|---|---|
| EP | 3200126 A2 | 8/2017 |
| JP | 2010-211579 | 9/2010 |
| JP | 2016-173669 | 9/2016 |
| JP | 2016-212636 | 12/2016 |
| JP | 2017-097574 | 6/2017 |
| JP | 2017-136136 | 8/2017 |
| WO | 2012/014304 | 2/2012 |
| WO | 2013/046365 | 4/2013 |

\* cited by examiner

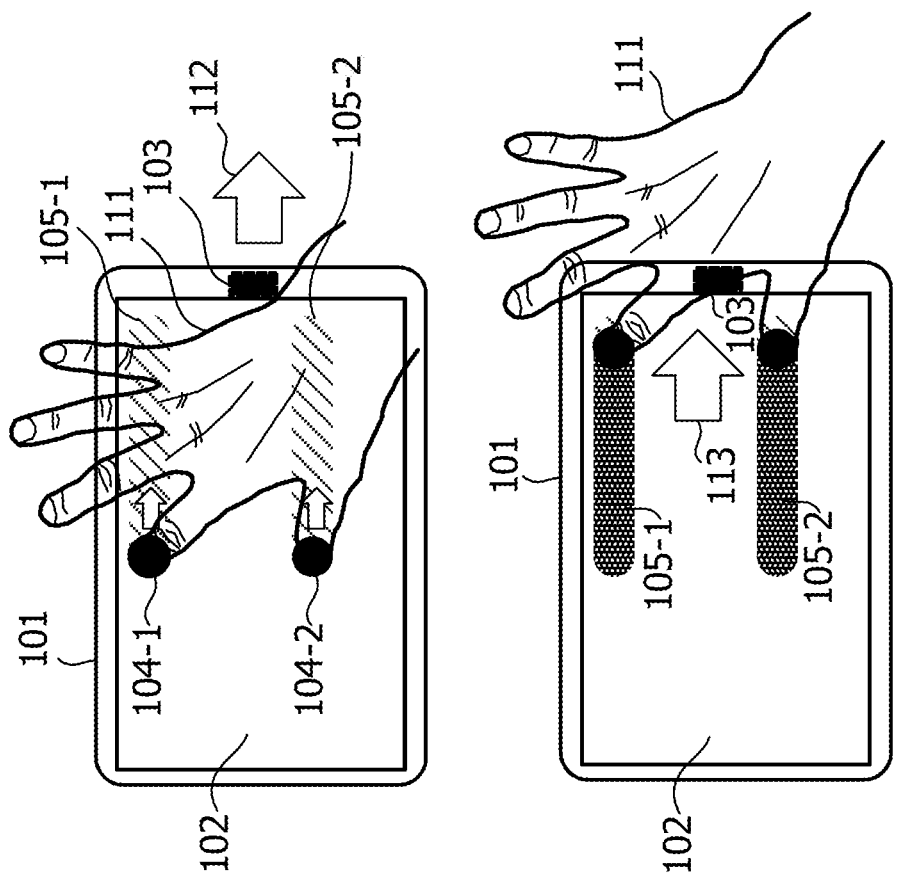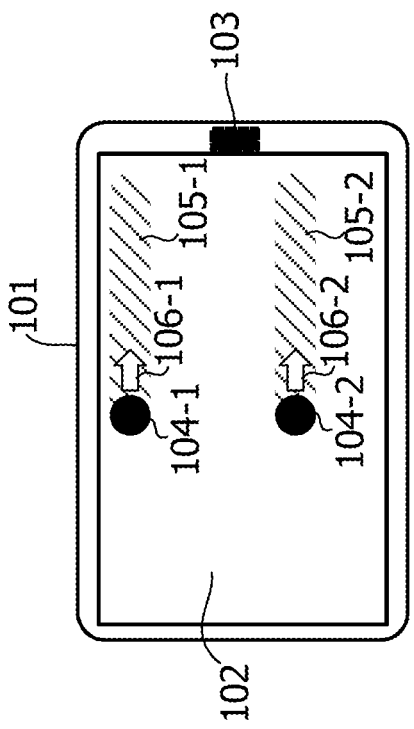

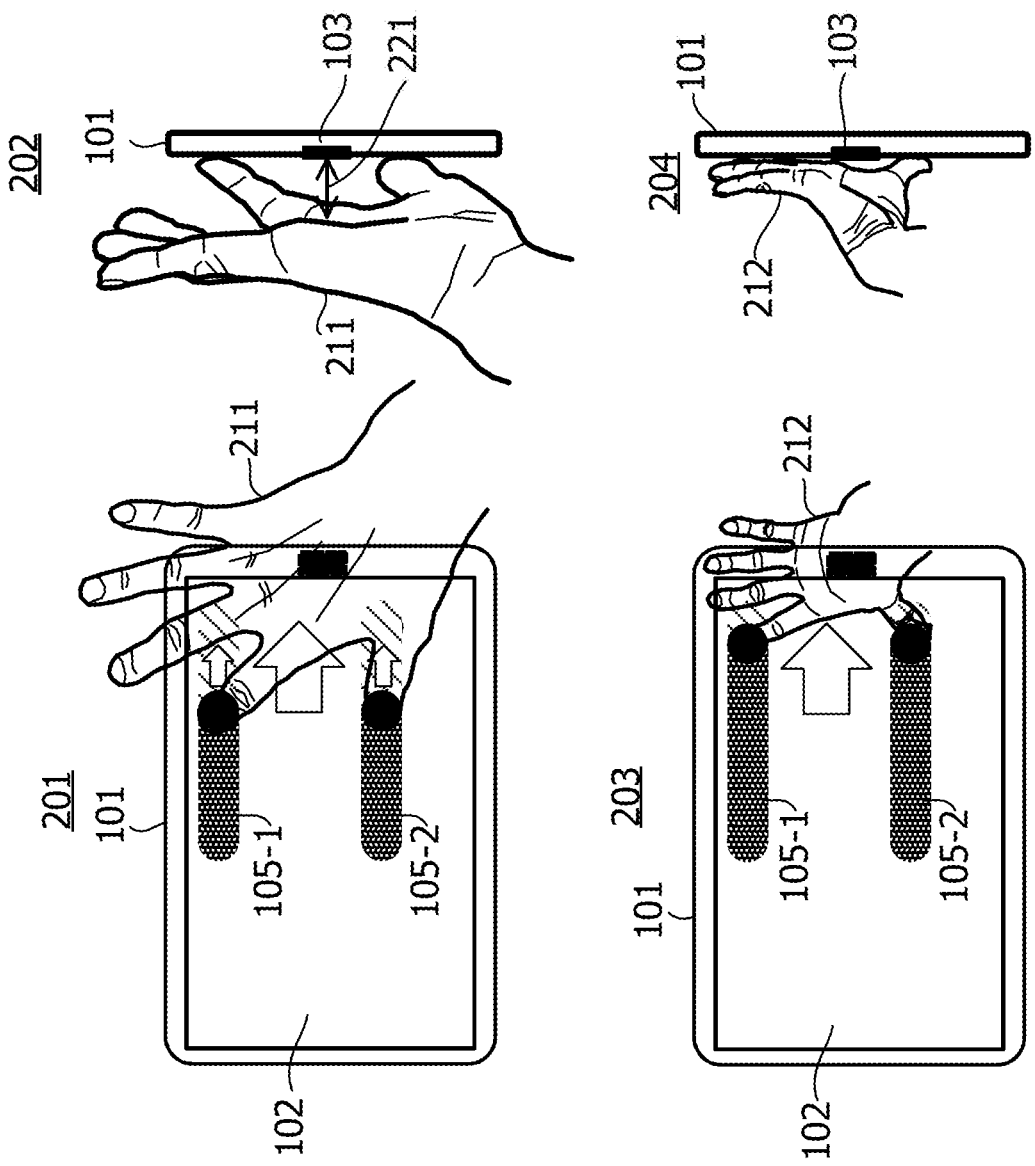

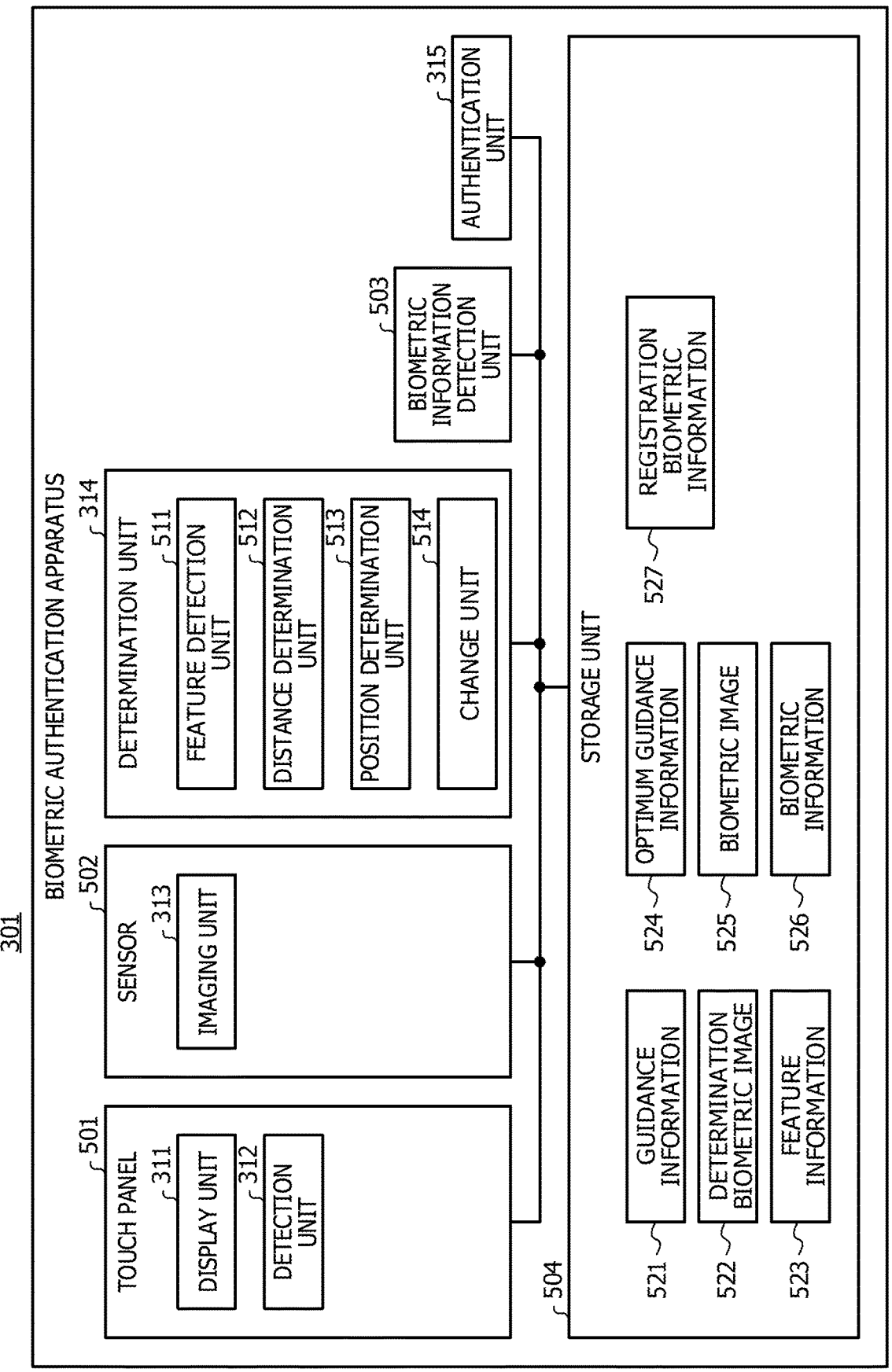

HIGH FREQUENCY COMPONENTS

BIOMETRIC AUTHENTICATION APPARATUS AND BIOMETRIC AUTHENTICATION METHOD

CROSS-REFERENCE TO RELATED APPLICATION

This application is based upon and claims the benefit of priority of the prior Japanese Patent Application No. 2018-13203, filed on Jan. 30, 2018, the entire contents of which are incorporated herein by reference.

FIELD

The embodiments discussed herein are related to biometric authentication techniques.

BACKGROUND

In recent years, biometric authentication techniques have been developed that authenticate a user by using biometric information, such as a fingerprint, a palm print, veins, a face, or the like. For example, in a biometric authentication apparatus that authenticates a user of a device or a system by using a biometric authentication technique, matching is performed between input biometric information represented by a biometric image of a person to be authenticated and registration biometric information represented by a biometric image of a person registered in advance. When the biometric authentication apparatus determines that the input biometric information matches the registration biometric information based on a matching result, the biometric authentication apparatus authenticates a person to be authenticated as a registered person who has an authorized privileges and permits the person to use an apparatus including the biometric authentication apparatus or the other apparatus connected to the biometric authentication apparatus.

Biometric authentication techniques that use a mobile terminal device and biometric authentication techniques that use a guidance for leading a user's hand or finger, a guidance image, or the like are known.

For example, related-art techniques are disclosed in Japanese Laid-open Patent Publication No. 2016-173669, Japanese Laid-open Patent Publication No. 2017-097574, Japanese Laid-open Patent Publication No. 2016-212636, International Publication Pamphlet No. WO 2012/014304, International Publication Pamphlet No. WO 2013/046365, Japanese Laid-open Patent Publication No. 2010-211579, and Japanese Laid-open Patent Publication No. 2017-136136.

SUMMARY

According to an aspect of the embodiments, a biometric authentication apparatus includes an imaging device, a display device, a memory, and a processor configured to display, on a screen of the display device, a guidance indicating a target area to be in contact with a part of a human body, detect whether the part of the human body is in contact with the target area, when the part of the human body is in contact with the target area, determine a distance between the imaging device and another part of the human body in accordance with an image captured by the imaging device, the image including the other part of the human body, and perform a change of a display position of the guidance in accordance with the determined distance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are diagrams illustrating an acquisition method of a biometric image using a guidance figure.

FIGS. 2A and 2B are diagrams illustrating the relationship between the interval of guide rails and the size of a hand.

FIG. 5 is a functional configuration diagram illustrating a specific example of the biometric authentication apparatus.

DESCRIPTION OF EMBODIMENTS

Figure 3:
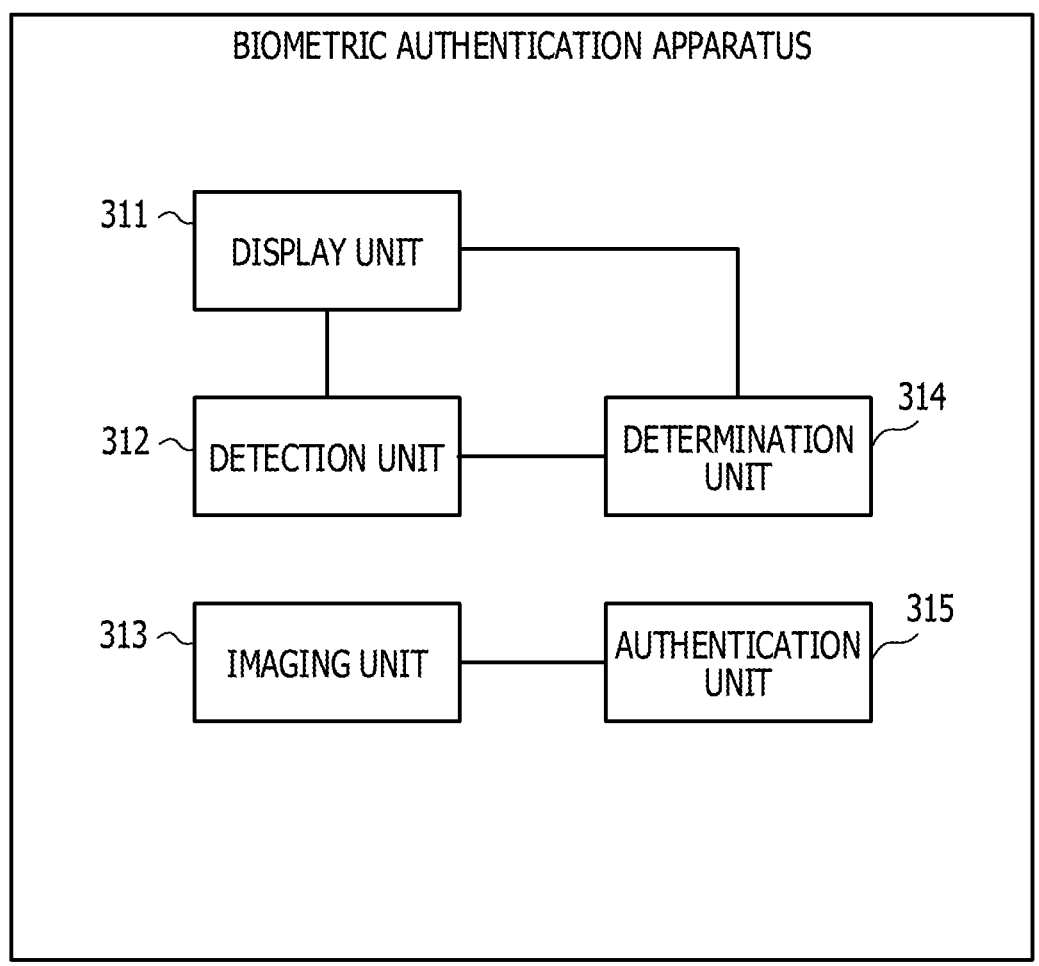
FIG. 3 is a functional configuration diagram of a biometric authentication apparatus.

In a related-art method, a biometric image of a hand of a user is obtained by displaying an operation guidance figure on the touch panel of a mobile terminal device in a state in which the user is in contact with the touch panel in accordance with the guidance figure. In this method, if the size of the hand is not suitable for the guidance figure, the biometric image sometimes becomes unclear. In this case, the precision of the biometric information detected from the biometric image of the hand deteriorates, and thus the precision of the biometric authentication also deteriorates. Such a problem occurs not only in the case of performing biometric authentication using a biometric image but also in the case of performing biometric authentication using the other biometric images.

In the following, a detailed description will be given of an embodiment with reference to the drawings.

A biometric authentication apparatus is used in various fields, such as for logon control of a personal computer, for an automated teller machine (ATM) at a bank, entrance and exit management, and the like. In recent years, in order to further expand the range of applications of a biometric authentication apparatus, developments are being underway for a biometric authentication apparatus capable of being incorporated in a small-sized mobile terminal device, or the like, or a biometric authentication method for use in a small-sized mobile terminal device.

In many cases, a user holds a mobile terminal device by one hand and operates a touch panel, or the like disposed on the mobile terminal device so as to use the mobile terminal device. In such a peculiar way of using a mobile terminal device, when the user operated to raise his or her hand in a space, or the like, the position of the hand does not become stable, and thus the biometric information detected from a biometric image becomes unstable. Thus, an operation method is sometimes used in which an operation guidance figure is displayed on a touch panel so as to prompt the user to touch the panel in accordance with the guidance.

FIGS. 1A and 1B illustrate an example of an acquisition method of a biometric image using a guidance figure displayed on a screen including a display device, which is mounted on a small-sized mobile terminal device, such as a liquid crystal display (LCD), an organic electro luminescence (EL), or the like and a touch panel. FIG. 1A illustrates an example of guidance figures displayed on a screen including a display device and a touch panel. A mobile terminal device 101 includes a touch panel 102 and a sensor 103.

The guidance figures displayed on the screen of the touch panel 102 include a mark 104-1 and a mark 104-2 that indicate the positions to be touched by respective fingers, and a guide rail 105-1 and a guide rail 105-2 that indicate respective areas in which the respective marks moves. The mark 104-1 moves in the direction indicated by an arrow 106-1 on the guide rail 105-1, and the mark 104-2 moves in the direction indicated by an arrow 106-2 on the guide rail 105-2.

FIG. 1B illustrates examples in which hands are moved in accordance with the guidance figures. In a state in which a user brings an index finger of his or her hand 111 into contact with the mark 104-1 and brings a thumb in contact with the mark 104-2, the user traces the guide rail 105-1 and the guide rail 105-2 by the two respective fingers. Thereby, the hand 111 moves in the direction indicated by an arrow 112 and an arrow 113. The sensor 103 is a biometric authentication sensor, such as a vein sensor, a camera, or the like and obtains a biometric image of the palm by capturing an image of a palm while the hand 111 is moved.

The user brings the two fingers into contact with the respective guidance figures so that the shaking of the hand 111 stops and the movement of the hand 111 becomes stable. By obtaining a biometric image of a palm in a state in which the movement of the hand 111 is stable, it becomes possible to fix the relative positional relationship between the mobile terminal device 101 and the hand 111 and reliably detect biometric information.

By the method of obtaining the biometric image in FIGS. 1A and 1B, it is possible to use, for example, the techniques disclosed in Japanese Laid-open Patent Publication No. 2016-173669, Japanese Laid-open Patent Publication No. 2017-097574, and Japanese Laid-open Patent Publication No. 2016-212636. With the technique disclosed in Japanese Laid-open Patent Publication No. 2016-173669, by associating the coordinates of the position on the touch panel the user has contacted and the image capturing range of the sensor so that it is possible to improve the authentication precision. With the technique disclosed in Japanese Laid-open Patent Publication No. 2017-097574, by bringing a plurality of fingers into contact with a touch panel at the same time, it is possible to suppress the rotation of a hand with respect to a mobile terminal device and fix the relative positional relationship. With the technique disclosed in Japanese Laid-open Patent Publication No. 2016-212636, it is possible to display the positions on the touch panel to be in contact with the user in sequence and to capture a biometric image so as to efficiently obtain biometric information.

However, by the method of obtaining the biometric image in FIGS. 1A and 1B, the distance between the guide rail 105-1 and the guide rail 105-2 is fixed, if the size of the hand 111 is not suitable for the distance, a biometric image captured by the sensor 103 sometimes becomes unclear.

FIGS. 2A and 2B illustrate the relationship between the interval of the guide rails and the size of a hand. A camera included in the sensor 103 has a fixed depth of field.

FIG. 2A illustrates an example of a hand suitable for the interval of the guide rails. A top view 201 is a view taken from a direction looking down the screen of the touch panel 102, and a side view 202 is a view taken from the side of the touch panel 102. In this case, as illustrated in the top view 201, the size of a hand 211 is suitable for the interval between the guide rail 105-1 and the guide rail 105-2, and thus it is possible for the user to touch the mark 104-1 and the mark 104-2 with the two respective fingers with a margin in space.

Accordingly, as illustrated in the side view 202, the distance 221 (height of a palm) between the sensor 103 and the palm is within the depth of field of the sensor 103 in a state in which the two respective fingers are in contact with the mark 104-1 and the mark 104-2. Accordingly, it is possible for the sensor 103 to capture a clear biometric image of the palm, and thus the precision of the biometric information detected from the palm is improved.

FIG. 2B illustrates an example of a hand not suitable for the interval of the guide rails. In this case, as illustrated in a top view 203, the size of a hand 212 is small compared with the interval between the guide rail 105-1 and the guide rail 105-2, and each finger becomes shorter in accordance with the size of the hand 212. Accordingly, the user spreads the interval between the two fingers far apart and brings the respective fingers into contact with the mark 104-1 and the mark 104-2.

Thereby, as illustrated in a side view 204, the distance between the sensor 103 and the palm is short and becomes out of the depth of field of the sensor 103, and the biometric image of the palm captured by the sensor 103 becomes unclear. Accordingly, the precision of the biometric information detected from the palm deteriorates.

When the size of the hand is large compared with the interval of the guide rails, each finger becomes long in accordance with the size of the hand. Accordingly, it becomes difficult for the user to sufficiently spread the interval of the two fingers and brings the respective fingers in contact with the mark 104-1 and the mark 104-2 at a narrow interval. Thereby, the distance between the sensor 103 and the palm becomes long and out of the depth of field of the sensor 103. Accordingly, the biometric image of the palm becomes unclear, and thus the precision of the biometric information deteriorates.

FIG. 3 illustrates an example of the functional configuration of the biometric authentication apparatus. A biometric authentication apparatus 301 in FIG. 3 includes a display unit 311, a detection unit 312, an imaging unit 313, a determination unit 314, and an authentication unit 315.

Figure 4:
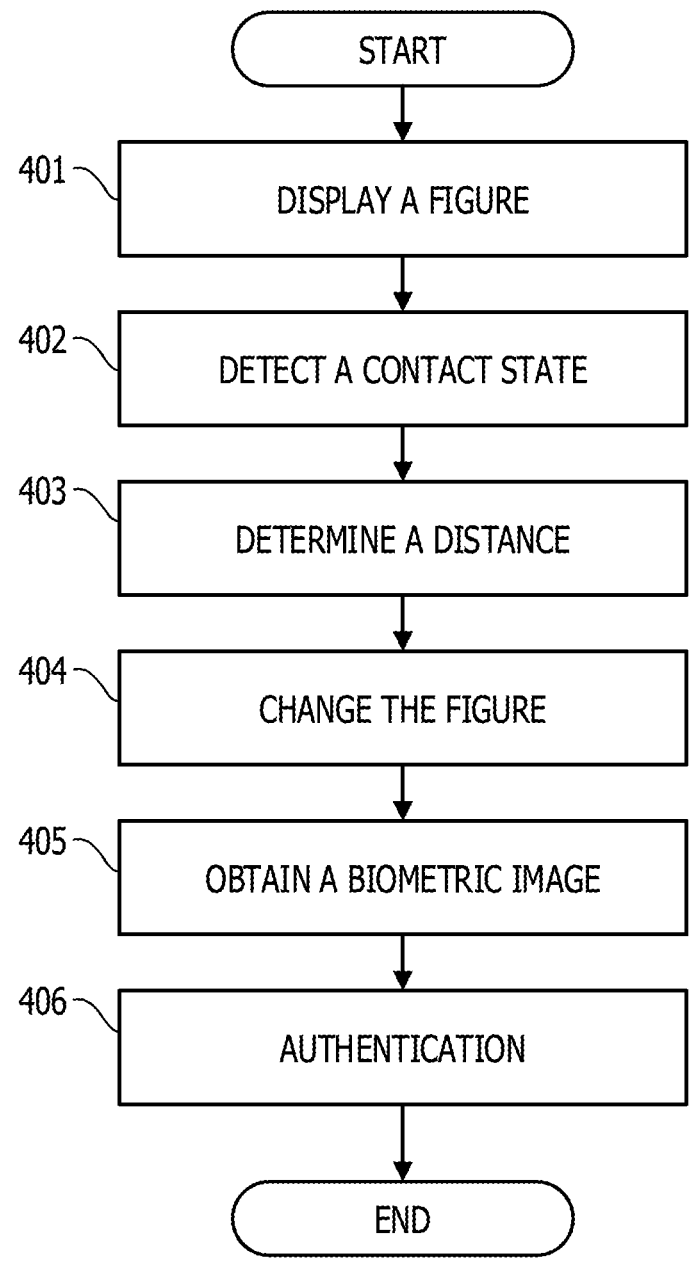
FIG. 4 is a flowchart of biometric authentication processing.

FIG. 4 is a flowchart of biometric authentication processing performed by the biometric authentication apparatus 301 in FIG. 3. First, the display unit 311 display figures illustrating the target areas to be in contact with parts of a human body on a screen (step 401), and the detection unit 312 detects a contact state in which the parts of a human body are in contact with the two respective target areas (step 402). The determination unit 314 determines the distance between the imaging unit 313 and a part of a human body in the contact state (step 403) and changes the figures based on a determination result (step 404).

Next, the imaging unit 313 captures the image of the part of the human body in the state in which the parts of a human body are in contact with the two respective points in the target areas illustrated by the changed figures so as to obtain the biometric image (step 405). The authentication unit 315 performs authentication on the part of the human body based on the biometric image (step 406).

With such a biometric authentication apparatus 301, it is possible to improve the authentication precision in the biometric authentication in which figures illustrating areas to be in contact with the parts of a human body is displayed to obtain a biometric image.

FIG. 5 is a functional configuration diagram illustrating a specific example of the biometric authentication apparatus 301 in FIG. 3. The biometric authentication apparatus 301 in FIG. 5 is, for example, a mobile terminal device, such as a smartphone, a tablet, or the like and includes a determination unit 314, an authentication unit 315, a touch panel 501, a sensor 502, a biometric information detection unit 503, and a storage unit 504. The storage unit 504 stores guidance information 521 indicating a guidance figure. The guidance figures are figures indicating target areas to be in contact with the respective fingers of a user.

The touch panel 501 includes a display unit 311 and a detection unit 312. The display unit 311 displays guidance figures indicated by the guidance information 521 on the screen. For the display unit 311, it is possible to use a liquid crystal display, an organic electroluminescence display, or the like.

The detection unit 312 detects the coordinates indicating the positions where the fingers are in contact on the screen and detects the contact state in which the two fingers are in contact with the two respective points in the target area using the detected coordinates. For the detection unit 312, it is possible to use a touch sensor of a resistance film method, an electrostatic capacitance method, or the like.

The sensor 502 includes an imaging unit 313, and the imaging unit 313 captures the image of a palm of the user in the contact state in which the two fingers are in contact with the two respective points in the target area and obtains a determination biometric image 522. The determination biometric image 522 obtained by the imaging unit 313 is stored in the storage unit 504.

The imaging unit 313 is a camera including an image sensor, such as a complementary metal oxide semiconductor (CMOS), a charge coupled device (CCD), or the like, and the determination biometric image 522 is a vein image, a palm print image, or the like. When the determination biometric image 522 is a vein image, a vein sensor is used as the sensor 502, and the sensor 502 radiates near infrared rays, or the like onto the palm to capture the image of the inner blood vessels of the hand, or the like.

The determination unit 314 includes a feature detection unit 511, a distance determination unit 512, a position determination unit 513, and a change unit 514. The feature detection unit 511 detects feature information 523 from the determination biometric image 522 and stores the information in the storage unit 504. The distance determination unit 512 determines whether or not the distance between the sensor 502 and the palm is suitable for capturing the image of the hand using the feature information 523. The position determination unit 513 determines whether or not the display position of the guidance figure on the screen is suitable for capturing the image of the palm using the feature information 523.

If at least one of the distance between the sensor 502 and the palm or the display position of the guidance figure is not suitable for capturing the image of the palm, the change unit 514 changes the guidance information 521 so as to change the shape or the display position of the guidance figure. On the other hand, if the distance between the sensor 502 and the palm, and the display position of the guidance figure is suitable for capturing the image of the hand, the change unit 514 stores the guidance information 521 at that time in the storage unit 504 as optimum guidance information 524. The optimum guidance information 524 represents the guidance figure suitable for the size of the hand of the user.

For example, the biometric authentication apparatus 301 generates optimum guidance information 524 in registration processing for registering the biometric information of a registered person and displays the optimum guidance information 524 on the screen so as to capture the biometric image of the registered person. In authentication processing for authenticating a person to be authenticated, the biometric authentication apparatus 301 displays the optimum guidance information 524 on the screen so as to capture the biometric image of the person to be authenticated.

In the authentication processing, the biometric authentication apparatus 301 generates optimum guidance information 524 again and displays the optimum guidance information 524 on the screen so as to make it possible to capture the biometric image of a person to be authenticated.

In the registration processing or the authentication processing, the display unit 311 displays the guidance figure indicated by the optimum guidance information 524 on the screen, and the detection unit 312 detects a contact state in which the two fingers of the user are in contact with the two respective points in the target area. The imaging unit 313 captures the image of the palm in the detected contact state and obtains a biometric image 525, such as a vein image, a palm print image, or the like. The biometric image 525 obtained by the imaging unit 313 is stored in the storage unit 504.

The biometric information detection unit 503 detects biometric information 526 from the biometric image 525 and stores the biometric information 526 in the storage unit 504. For example, if the biometric image 525 is a vein image, the feature quantity of the vein pattern is extracted as the biometric information 526, and if the biometric image 525 is a palm print image, the feature quantity of the palm print is extracted as the biometric information 526. If the user is a registered person, the biometric information detection unit 503 generates registration biometric information 527 including the biometric information 526 and stores the registration biometric information 527 in the storage unit 504.

If the user is a person to be authenticated, the authentication unit 315 compares the biometric information 526 and the registration biometric information 527 and performs authentication on a person to be authenticated based on a comparison result. For example, if the similarity between the biometric information 526 and the registration biometric information 527 is higher than a threshold value, the authentication unit 315 determines that a person to be authenticated is a registered person. The display unit 311 displays an authentication result on the screen.

Figures 6A, 6B:
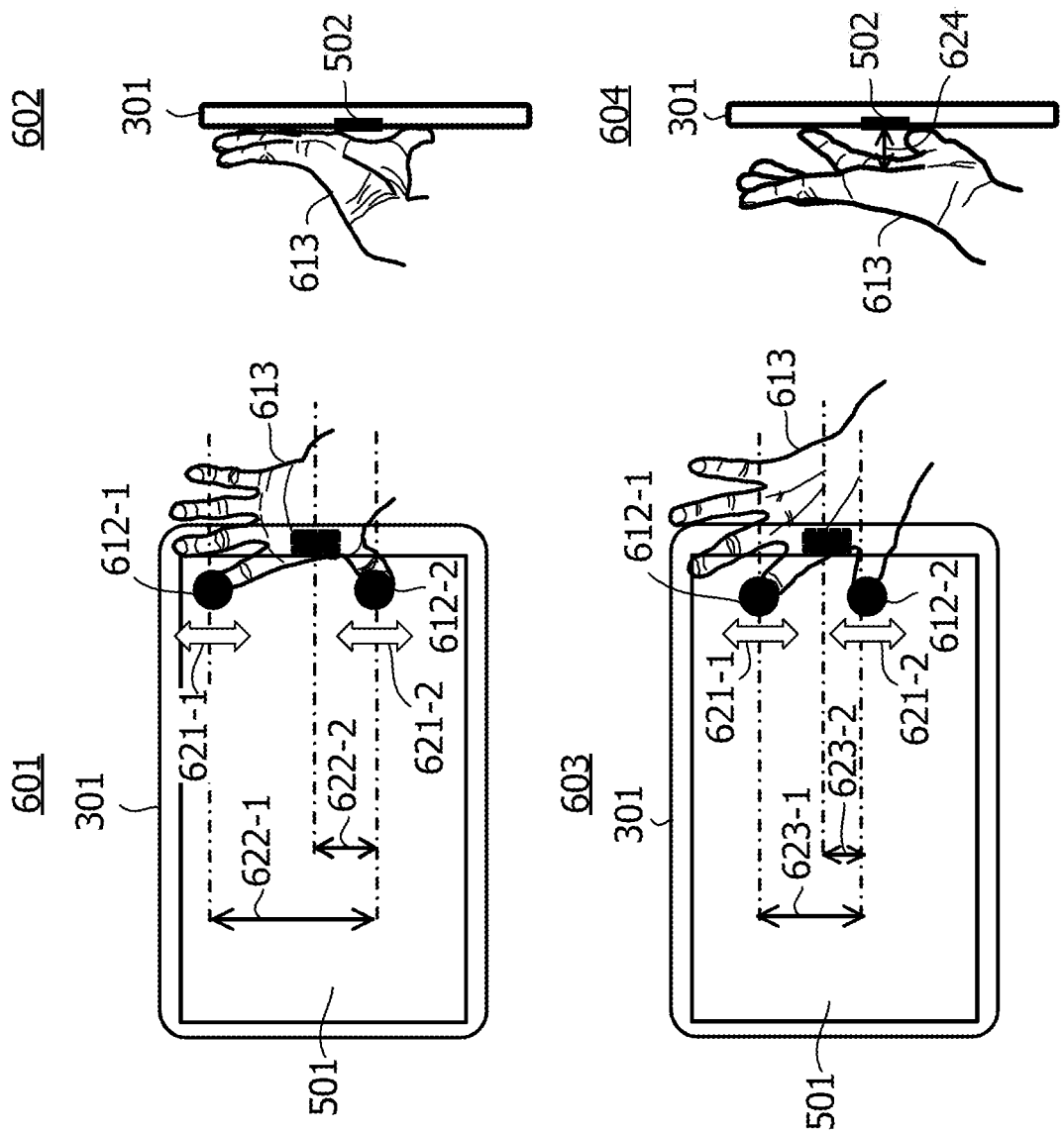
FIGS. 6A and 6B are diagrams illustrating adjustment processing.

FIGS. 6A and 6B illustrate an example of adjustment processing in which the biometric authentication apparatus 301 in FIG. 5 changes the guidance information 521. FIG. 6A illustrates an example of the guidance figure represented by the guidance information 521 before adjustment. A top view 601 is a view taken from a direction looking down the screen of the touch panel 501, and a side view 602 is a view taken from the side of the touch panel 501.

As illustrated in the top view 601, the guidance figure includes a mark 612-1 and a mark 612-2 that illustrate the target areas to be in contact with the respective fingers. In this case, the target areas include two areas indicated by the two respective figures of the mark 612-1 and the mark 612-2, and the two respective points in the target area correspond to a point in the area of the mark 612-1 and a point in the area of the mark 612-2.

The size of the hand 613 is small compared with the distance 622-1 between the mark 612-1 and the mark 612-2, and thus the user spreads the interval between the two fingers far apart so as to bring the respective fingers into contact with the mark 612-1 and the mark 612-2. Thereby, as illustrated in the side view 602, the distance between the sensor 502 and the palm becomes shorter than the depth of field of the imaging unit 313, and the distance determination unit 512 determines that the distance is not suitable for capturing the image of the palm.

Thus, the change unit 514 changes the guidance information 521 so as to change the position of the mark 612-1 in the adjustment range 621-1 and change the position of the mark 612-2 in the adjustment range 621-2. Thereby, the distance 622-1 is changed and the distance 622-2 from the sensor 502 to the mark 612-2 is also changed.

FIG. 6B illustrates an example of the guidance figure represented by the guidance information 521 after adjustment. As illustrated in a top view 603, the distance 623-1 between the mark 612-1 and the mark 612-2 after the adjustment becomes shorter than the distance 622-1 before the adjustment. The distance 623-2 from the sensor 502 to the mark 612-2 after the adjustment becomes shorter than the distance 622-2 before the adjustment. In this case, the distance 623-1 between the positions of the mark 612-1 and the mark 612-2 is adapted for the size of the hand 613, and thus it is possible for the user to bring the two respective fingers into contact with the mark 612-1 and the mark 612-2 with a margin in space.

Accordingly, as illustrated in a side view 604, the distance 624 between the sensor 502 and the palm is within the depth of field of the sensor 502 in the state in which the two respective fingers are in contact with the mark 612-1 and the mark 612-2. Accordingly, the distance determination unit 512 determines that the distance 624 is suitable for capturing the image of the palm, and the change unit 514 stores the guidance information 521 after the change in the storage unit 504 as optimum guidance information 524.

With the biometric authentication apparatus 301 in FIG. 5, if the distance between the sensor 502 and the palm or the display position of the guidance figure is not suitable for capturing the image of the palm, by changing the shape or the display position of the guidance figure, a suitable guidance figure is displayed. Thereby, it is possible to lead the palm of the user to a position within the depth of field of the imaging unit 313 with a low-cost configuration, and it becomes possible to obtain a clear biometric image. Accordingly, the precision of the biometric information obtained from the biometric image is improved, and the authentication precision of the biometric authentication using the biometric information is also improved.

Figure 7:
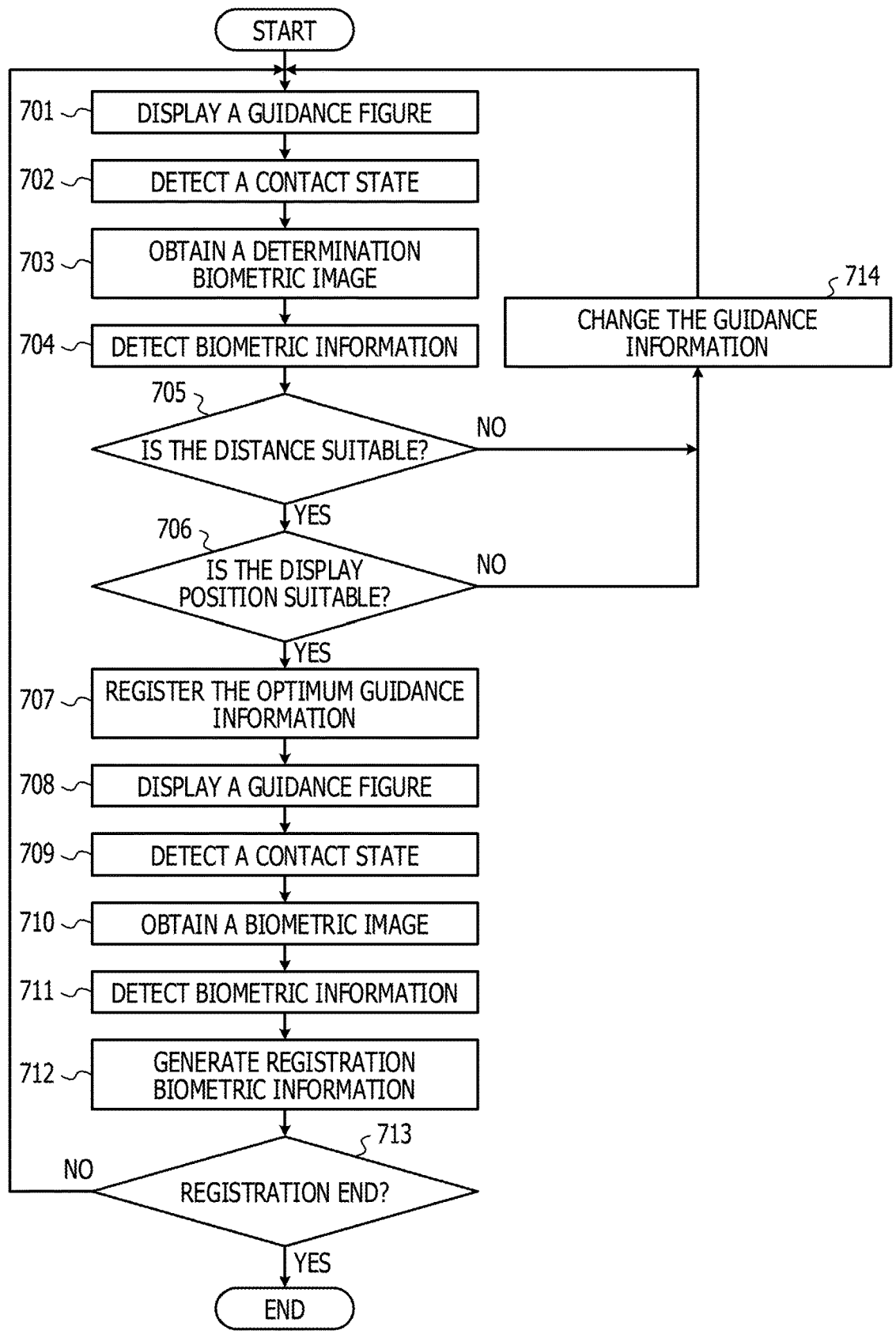
FIG. 7 is a flowchart of registration processing.

FIG. 7 is a flowchart illustrating an example of the registration processing performed by the biometric authentication apparatus 301 in FIG. 5. First, the display unit 311 displays the guidance figures represented by the guidance information 521 on the screen (step 701), and the detection unit 312 detects a contact state in which the two fingers of a registered person are in contact with two respective points in the target area (step 702). The imaging unit 313 captures the image of the palm of the user in the contact state and obtains the determination biometric image 522 (step 703).

Next, the feature detection unit 511 detects the feature information 523 from the determination biometric image 522 (step 704), and the distance determination unit 512 determines whether or not a distance D between the sensor 502 and the palm is suitable for capturing the image of the palm using the feature information 523 (step 705).

If the distance D is not suitable for capturing the image of the palm (step 705, NO), the change unit 514 changes the guidance information 521 (step 714), and the biometric authentication apparatus 301 repeats the processing of step 701 and the subsequent processing.

If the distance D is suitable for capturing the image of the palm (step 705, YES), the position determination unit 513 determines whether or not the display positions of the guidance figures are suitable for capturing the image of the palm using the feature information 523 (step 706).

If the display positions of the guidance figures are not suitable for capturing the image of the palm guidance figure (step 706, NO), the change unit 514 changes the guidance information 521 (step 714), and the biometric authentication apparatus 301 repeats the processing of step 701 and the subsequent processing.

If the display positions of the guidance figures are suitable for capturing the image of the palm (step 706, YES), the change unit 514 registers the guidance information 521 at that time in the storage unit 504 as the optimum guidance information 524 (step 707).

Next, the display unit 311 displays the guidance figures represented by the optimum guidance information 524 on the screen (step 708), and the detection unit 312 detects a contact state in which the two fingers of a registered person are in contact with two respective points in the target area (step 709). The imaging unit 313 captures the image of the palm in the detected contact state and obtains the biometric image 525 (step 710).

Next, the biometric information detection unit 503 detects the biometric information 526 from the biometric image 525 (step 711), generates registration biometric information 527 including the biometric information 526, and registers the registration biometric information 527 in the storage unit 504 (step 712).

Next, the biometric authentication apparatus 301 determines whether or not to terminate registering the biometric information (step 713), and if the biometric authentication apparatus 301 determines not to terminate registering the biometric information (step 713, NO), the biometric authentication apparatus 301 repeats the processing of step 701 and the subsequent processing. On the other hand, if the biometric authentication apparatus 301 determines to terminate registering the biometric information (step 713, YES), the biometric authentication apparatus 301 terminates the processing.

For example, in the case where the biometric information of the both hands of a registered person is to be registered, when only the biometric information of one hand is registered, the biometric authentication apparatus 301 determines that the registration of the biometric information has not been terminated and repeats the processing of step 701 and the subsequent processing for the other hand as a registration target. When the biometric authentication apparatus 301 has registered the biometric information of the both hands, the biometric authentication apparatus 301 determines to terminate the registration of the biometric information.

In step 704 in FIG. 7, it is possible for the feature detection unit 511 to detect feature information 523 based on the distribution of the frequency components or the pixel values of the determination biometric image 522.

Figure 8:
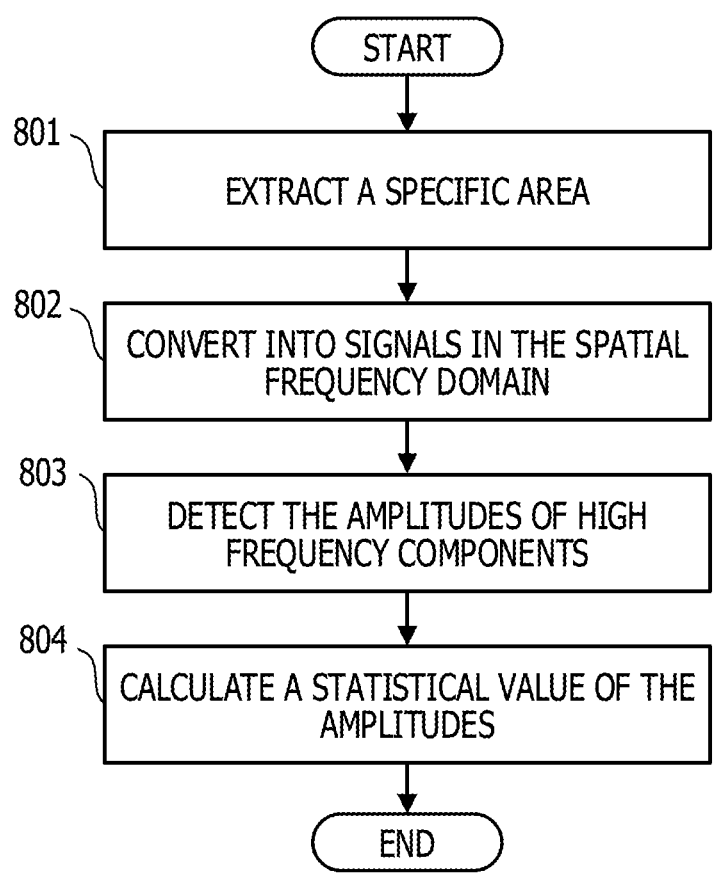
FIG. 8 is a flowchart of first feature detection processing.

FIG. 8 is a flowchart illustrating an example of first feature detection processing for detecting the feature information 523 based on the distribution of the determination biometric image 522. First, the feature detection unit 511 extracts a specific area of a predetermined size from the determination biometric image 522 (step 801) and converts the image of the extracted specific area into signals in the spatial frequency domain (step 802). For example, it is possible for the feature detection unit 511 to converts the image of the extracted specific area into signals in the spatial frequency domain using the two-dimensional fast Fourier transform (FFT).

Figure 9:
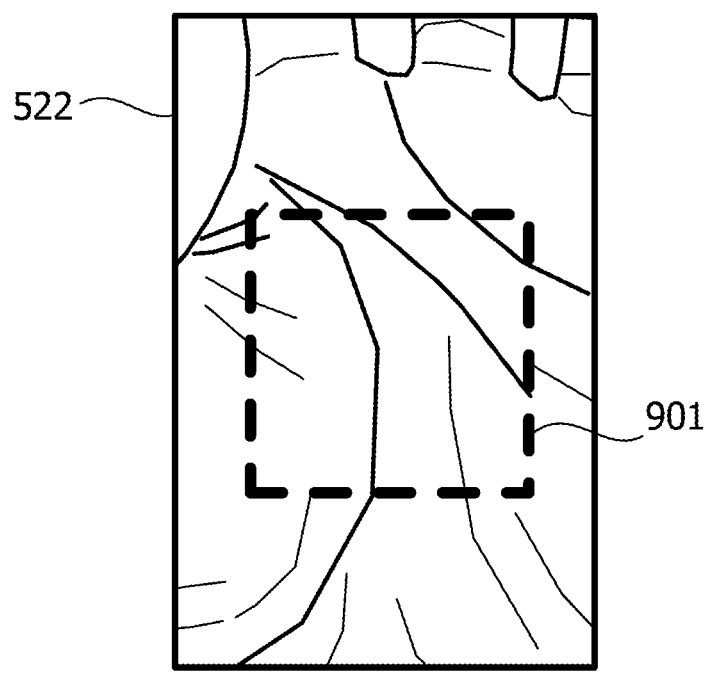
FIG. 9 is a diagram illustrating a specific area.

FIG. 9 illustrates an example of a specific area in the determination biometric image 522. The specific area 901 in FIG. 9 corresponds to a part of the image of the palm taken in the determination biometric image 522. The feature detection unit 511 may use the entire determination biometric image 522 as the specific area in place of the specific area 901.

Figure 10:
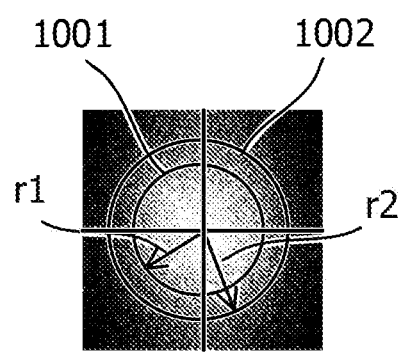
FIG. 10 is a diagram illustrating a conversion result of the specific area.

FIG. 10 illustrates an example of a conversion result of the specific area by the two-dimensional FFT. The horizontal axis of the conversion result in FIG. 10 represents horizontal direction frequency of the determination biometric image 522, the vertical axis represents vertical direction frequency of the determination biometric image 522, and the conversion result represents the distribution of the frequency components of the determination biometric image 522. The origin of conversion result corresponds to the direct current component.

When the distance D between the sensor 502 and the palm is within the depth of field, and the determination biometric image 522 is clear, the conversion result of the specific area includes many high frequency components. On the other hand, when the distance D is out of the depth of field, and the determination biometric image 522 is unclear, high frequency components are missing from the conversion result of the specific area, and the conversion result including mainly low frequency components is obtained.

Figure 11:
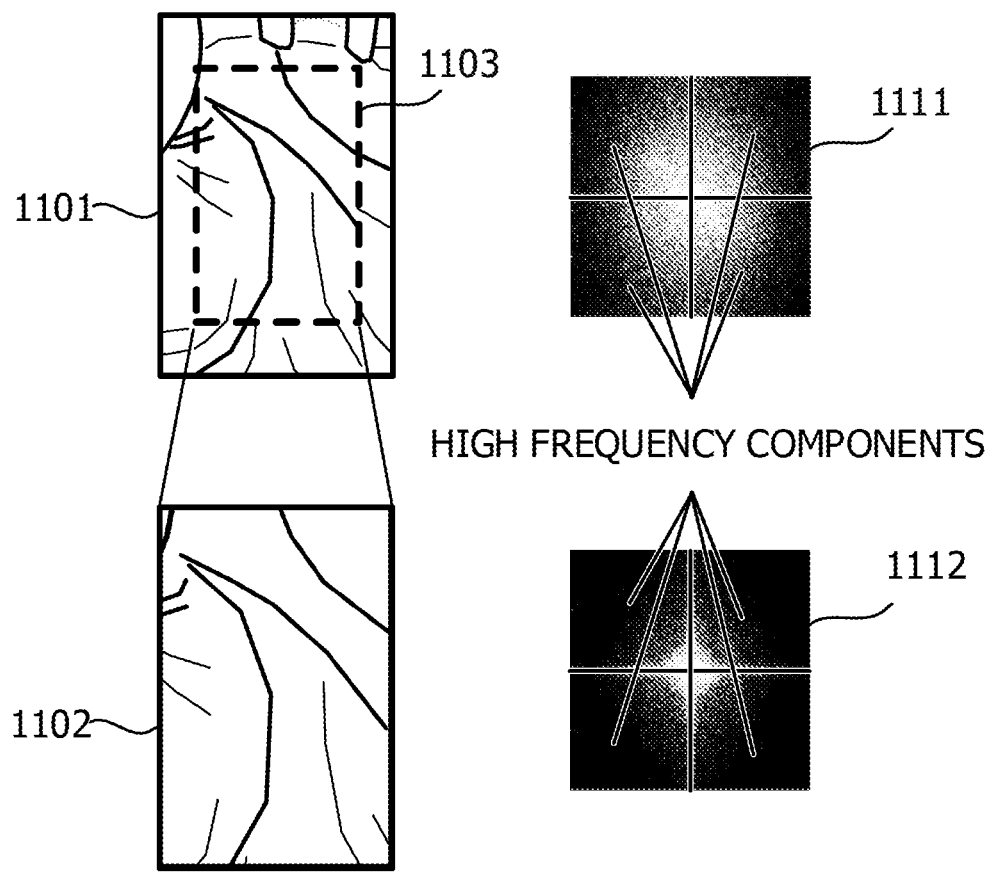
FIG. 11 is a diagram illustrating a comparison between conversion results.

FIG. 11 illustrates an example of the comparison between the conversion result of a clear biometric image and the conversion result of an unclear biometric image. When the distance D is within the depth of field, a clear biometric image 1101 is obtained as the determination biometric image 522, and the distribution 1111 of the frequency components of the biometric image 1101 includes many high frequency components. On the other hand, when the distance D is shorter than the depth of field, an unclear biometric image 1102 corresponding to a part of an area 1103 of the biometric image 1101 is obtained as the determination biometric image 522, and a distribution 1112 of the frequency components of the biometric image 1102 hardly includes high frequency components.

It is possible for the feature detection unit 511 to use the difference in the distribution of frequency components in accordance with such a distance D to detect high frequency components included in the conversion result so as to determine whether or not the distance D is suitable for capturing the image of the palm. Thus, the feature detection unit 511 analyzes the distribution of the frequency components indicated by the conversion result of the specific area and detects the amplitudes of the high frequency components (step 803), and calculates a statistical value of the detected amplitudes (step 804). It is possible to use the average value, the median, the maximum value, the minimum value, or the like as the statistical value.

In the example in FIG. 10, the feature detection unit 511 analyzes the distribution of the frequency components using a circle 1001 having a radius r1 with the origin of the conversion result as center and a circle 1002 having a radius r2 with the origin as center. The radius r2 is larger than the radius r1. In this case, the feature detection unit 511 detects the amplitude (grayscale value) of each point in the difference area produced by excluding the circle 1001 from the circle 1002 as the amplitude of the high frequency component at a corresponding point and calculates the statistical value of all the amplitudes in the area.

The area to be used for the high frequency component ought to be an area that excludes direct current components and is not limited to the difference area illustrated in FIG. 10. For example, the entire remaining area produced by excluding the circle 1001 may be used as a high frequency component, or a point on a predetermined line passing the origin may be used as a high frequency component.

The statistical value of the amplitudes, which has been calculated by the feature detection processing in FIG. 8 is used as the feature information 523 in step 705 in FIG. 7. In this case, the distance determination unit 512 compares the statistical value of the amplitudes with a predetermined threshold value. If the statistical value is higher than the threshold value, the distance determination unit 512 determines that the distance D is suitable for capturing the image of the palm, whereas if the statistical value is less than or equal to the threshold value, the distance determination unit 512 determines that the distance D is not suitable for capturing the image of the palm.

In this manner, it is possible to determine the distance between the sensor 502 and the palm by detecting the feature information 523 based on the distribution of the frequency components of the determination biometric image 522 without using a distance sensor.

Figure 12:
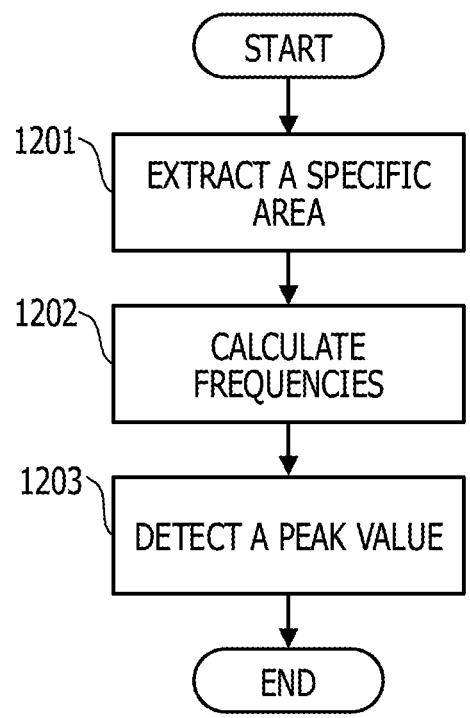
FIG. 12 is a flowchart of second feature detection processing.

FIG. 12 is a flowchart illustrating an example of second feature detection processing for detecting the feature information 523 based on the distribution of the pixel values of the determination biometric image 522. First, the feature detection unit 511 extracts a specific area of a predetermined size from the determination biometric image 522 (step 1201), and calculates the frequency of the occurrence of the pixels having each pixel value in the extracted specific area (step 1202). For example, it is possible for the feature detection unit 511 to calculate the frequency of the pixel value using the brightness value (grayscale value) as a pixel value.

Figure 13:
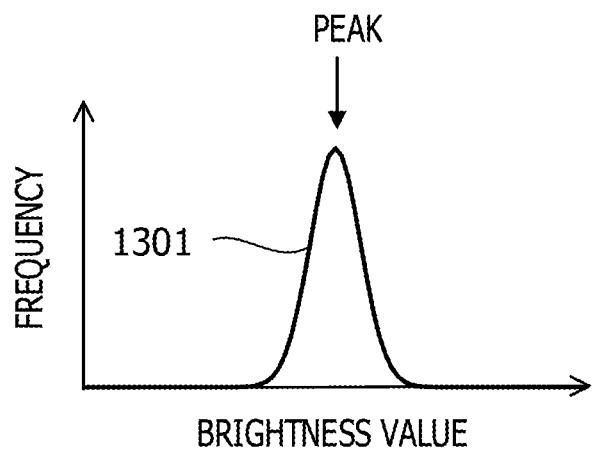
FIG. 13 is a diagram illustrating distribution of pixel values.

FIG. 13 is a diagram illustrating an example of the distribution of the pixel values of the determination biometric image 522. A distribution 1301 of the brightness values represents the occurrence frequency of the pixels having individual brightness values in a specific area.

In the case where the sensor 502 includes an illumination optical system, the sensor 502 emits light onto a palm, and the light reflected from the palm is received by the imaging unit 313 so that the biometric image of the palm is captured. Accordingly, if the distance D between the sensor 502 and the palm is shorter than the depth of field, so-called "blown out highlights" occurs at many positions in the biometric image, and the brightness value of many pixels becomes high at many pixels compared with the case where the distance D is within the depth of field. On the other hand, if the distance D is longer than the depth of field, the biometric image becomes dark, and the brightness value of many pixels becomes low at many pixels compared with the case where the distance D is within the depth of field.

Figure 14:
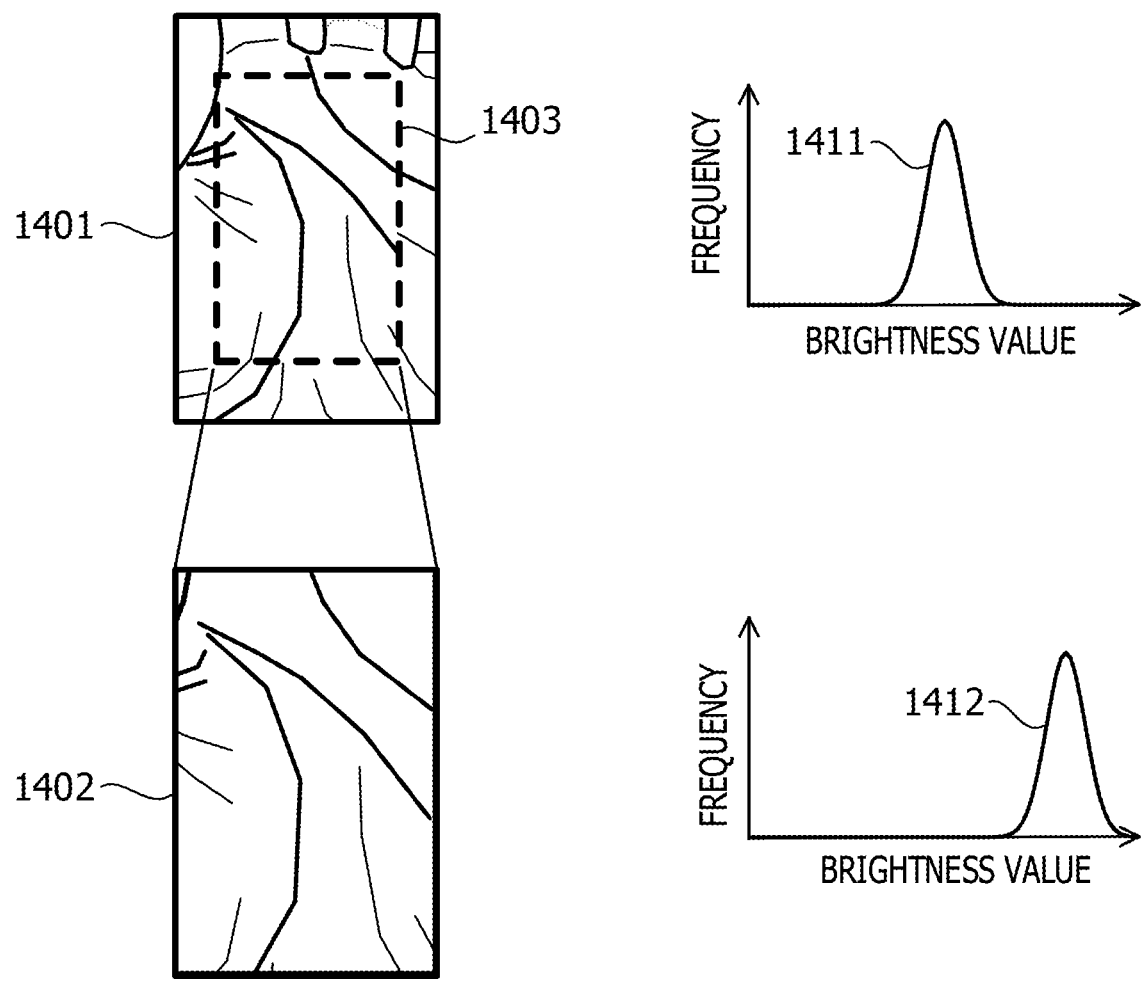
FIG. 14 is a diagram illustrating a comparison between the distributions of pixel values.

FIG. 14 is a diagram illustrating an example of the comparison between the distribution of pixel values of a biometric image irradiated with suitable light and the distribution of pixel values of a biometric image in which "blown out highlights" has occurred. If the distance D is within the depth of field, a biometric image 1401 having a suitable brightness is obtained as the determination biometric image 522. On the other hand, if the distance D is shorter than the depth of field, a biometric image 1402 is obtained in which "blown out highlights" has occurred as the determination biometric image 522, which corresponds to a part of area 1403 of the biometric image 1401. A distribution 1412 of the brightness values in the biometric image 1402 is shifted in the direction of higher brightness value compared with a distribution 1411 of the brightness values in the biometric image 1401.

It is possible for the feature detection unit 511 to determine whether or not the distance D is suitable for capturing the image of a palm by detecting a pixel value having the maximum frequency using the difference in the distribution of pixel values in accordance with the distance D. Thus, the feature detection unit 511 detects a pixel value corresponding to the maximum frequency of the distribution of the pixel values as a peak value (step 1203). In the example in FIG. 13, the feature detection unit 511 detects a brightness value corresponding to the peak of the distribution 1301 in brightness value as a peak value.

It is possible for the feature detection unit 511 to detect a pixel value corresponding to a predetermined range peak as a peak value in place of the pixel value corresponding to the peak in the entire distribution of the pixel values.

Figure 15:
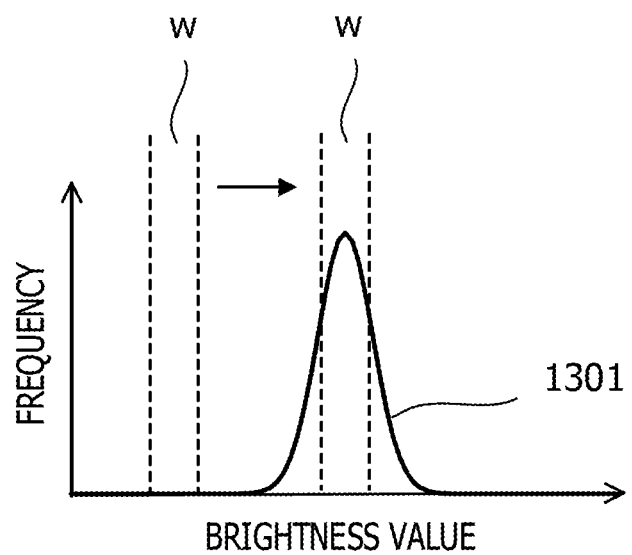
FIG. 15 is a diagram illustrating detection processing.

FIG. 15 illustrates an example of the detection processing for detecting a peak value from a predetermined range of the distribution of the pixel values. The feature detection unit 511 sets a window having a width W for the distribution 1301 of brightness values and calculates the total frequency by adding the frequencies of a plurality of brightness values of the individual positions in the window while shifting the window by a predetermined step. The feature detection unit 511 obtains a position of the window having the maximum total frequency and detects a pixel value corresponding to the peak in the window at the position as a peak value.

By such detection processing, it is possible to detect the original peak value even if the distribution 1301 of the brightness values includes noise having a high frequency.

The peak value detected by the feature detection processing in FIG. 12 is used as the feature information 523 in step 705 in FIG. 7. In this case, the distance determination unit 512 compares the peak value with a predetermined threshold value and determines whether or not the distance D is suitable for capturing the image of the palm based on the comparison result.

Figure 16:
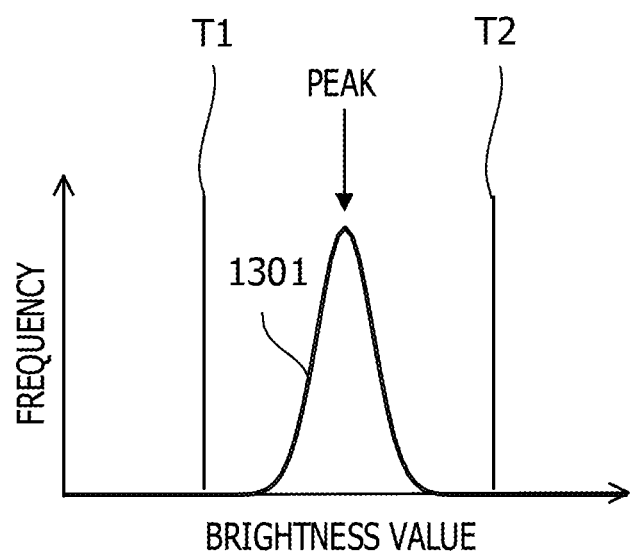
FIG. 16 is a diagram illustrating a threshold value with respect to a peak value.

FIG. 16 illustrates an example of a threshold value with respect to a peak value. A threshold value T1 represents a low-frequency threshold value, and a threshold value T2 represents a high-frequency threshold value. If the peak value is equal to or higher than the threshold value T1 and lower than or equal to the threshold value T2, the distance determination unit 512 determines that the distance D is suitable for capturing the image of the palm. If the peak value is lower than the threshold value T1, or the peak value is higher than the threshold value T2, the distance determination unit 512 determines that the distance D is not suitable for capturing the image of the palm.

In this manner, by detecting the feature information 523 based on the distribution of the pixel values of the determination biometric image 522, it is possible to determine the distance between the sensor 502 and the palm without using the distance sensor.

In step 704 in FIG. 7, it is possible for the feature detection unit 511 to detect the feature information 523 using the technique described in Japanese Laid-open Patent Publication No. 2017-136136. In this case, the feature detection unit 511 detects the feature information 523 based on the characteristic of the imaging unit 313, the movement quantity of the contact position when the contact position of the finger has moved on the screen, and the movement quantity of the biometric feature taken in the determination biometric image 522.

Figure 17:
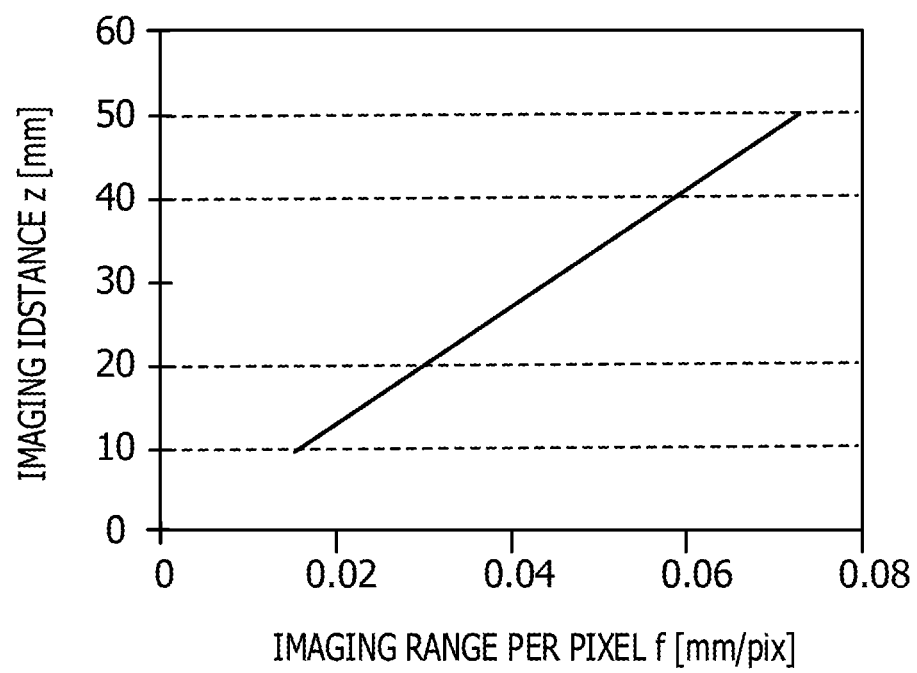
FIG. 17 is a diagram illustrating the characteristic information of an imaging device.

FIG. 17 illustrates an example of the characteristic information of an imaging device disclosed in Japanese Laid-open Patent Publication No. 2017-136136. The horizontal axis in FIG. 17 represents an imaging range f (mm/pix) per pixel of the image captured by the imaging device, the vertical axis represents an imaging distance z (mm), and the characteristic information represents the relationship between the imaging range f and the imaging distance z. The imaging range f represents the size of a subject corresponding to one pixel in the image, and the imaging distance z represents the distance between the imaging device and the subject.

The characteristic information in FIG. 17 is determined in accordance with the optical characteristic of the imaging device, such as an angle of view, or the like, and is possible to be generated in advance and stored in the storage unit 504. Thus, the feature detection unit 511 calculates the distance D between the sensor 502 and the palm using the characteristic information in FIG. 17 as the characteristic information of the imaging unit 313.

First, the feature detection unit 511 calculates the movement quantity α of the contact position indicating the coordinates detected by the detection unit 312 when the contact position of the finger of a user has moved on the screen of the display unit 311. At this time, the feature detection unit 511 also calculates the number of pixels β that represents the movement quantity of the biometric feature taken in the determination biometric image 522 obtained by the imaging unit 313. For the biometric feature, it is possible to use, for example, specific wrinkles, which are part of a palm print or a part of a vein pattern.

Next, the feature detection unit 511 obtains an imaging range f by dividing the movement quantity α by the number of pixels β and obtains an imaging distance z corresponding to the imaging range f from the characteristic information of the imaging unit 313. The obtained imaging distance z corresponds to the distance D between the sensor 502 and the palm.

The imaging distance z is used as the feature information 523 in step 705 in FIG. 7. In this case, the distance determination unit 512 compares the imaging distance z with the depth of field of the imaging unit 313. If the imaging distance z is within the depth of field, the distance determination unit 512 determines that the distance D is suitable for capturing the image of the palm, whereas if the imaging distance z is out of the depth of field, the distance determination unit 512 determines that the distance D is not suitable for capturing the image of the palm.

In this manner, it is possible to determine the distance between the sensor 502 and the palm by detecting the feature information 523 based on the characteristic information of the imaging unit 313, the movement quantity of the contact position on the screen, and the movement quantity of the biometric feature in the determination biometric image 522 without using the distance sensor.

The biometric authentication apparatus 301 may measure the distance between the sensor 502 and the palm using a distance sensor instead of detecting the feature information 523 from the determination biometric image 522 and determine the measured distance.

Incidentally, when the biometric authentication apparatus 301 performs biometric authentication using the image of a specific part of a palm, it is possible to guide the palm so as to make it possible for the imaging unit 313 to capture the image of the specific part by adjusting the display position of the guidance figure. Thereby, it is possible for the imaging unit 313 to obtain the image of the specific part as the determination biometric image 522 and the biometric image 525.

Figure 18A:
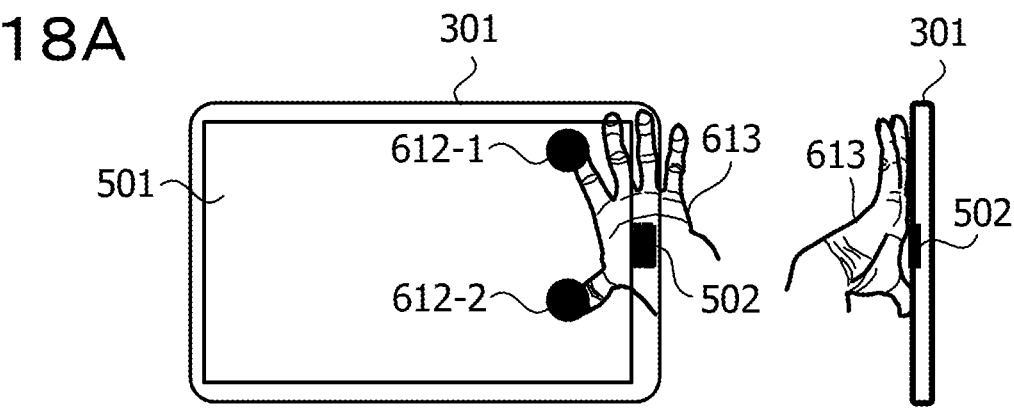
FIGS. 18A-18C are diagrams illustrating the positional relationship between a sensor and a palm.
Figure 18B:
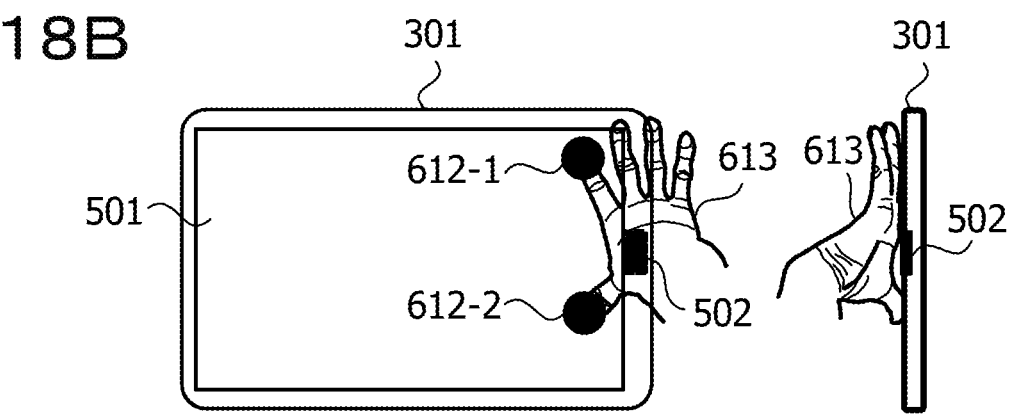
Figure 18C:
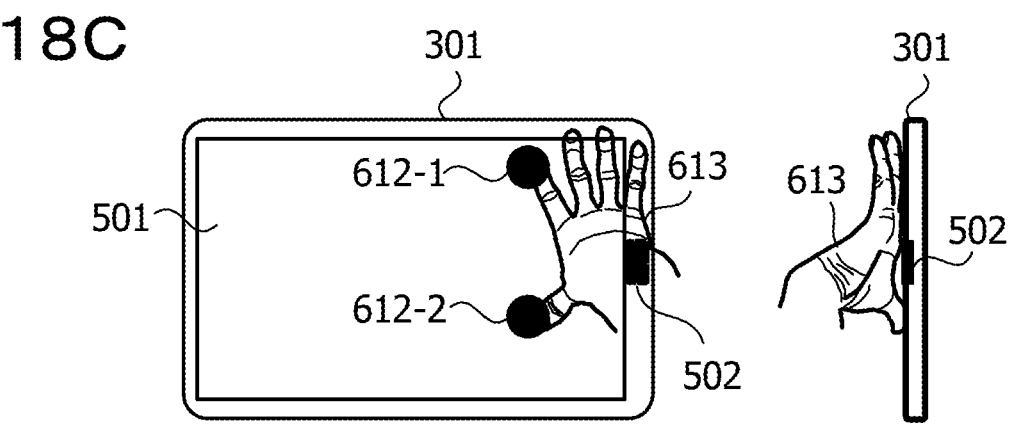

FIGS. 18A to 18C illustrate an example of the positional relationship between the sensor 502 and a palm when the display position of the guidance figure is changed. For example, as a specific part of a palm, the central part of a palm, a part including the base of a thumb (thenar), a part including the base of a little finger, or the like is used.

FIG. 18A illustrates the positional relationship in the case where the image of the central part of a palm is captured. In this case, a user touches a mark 612-1 and a mark 612-2 with the two respective fingers so that the central part of the palm is fixed at the position just above the sensor 502.

FIG. 18B illustrates the positional relationship in the case where the image of the thenar is captured. In this case, the user touches the mark 612-1 and the mark 612-2 with the two respective fingers so that the thenar is fixed at the position just above the sensor 502.

FIG. 18C illustrates the positional relationship in the case where the image of a base of a little finger is captured. In this case, the user touches the mark 612-1 and the mark 612-2 with the two respective fingers so that a part including the base of a little finger is fixed at the position just above the sensor 502.

In this manner, it is possible to more suitably determine the distance D between the sensor 502 and the palm, and the display position of the guidance figure by obtaining the image of a specific part of a palm to be used for biometric authentication as the determination biometric image 522. Thereby, the precision of the optimum guidance information 524 is improved.

Even if the distance D between the sensor 502 and the palm is suitable for capturing the image of the palm, the display position of the guidance figure does not have to be suitable for capturing the image of the palm. Thus, in step 706 in FIG. 7, the position determination unit 513 determines the display position of the guidance figure using the feature information 523.

Figure 19:
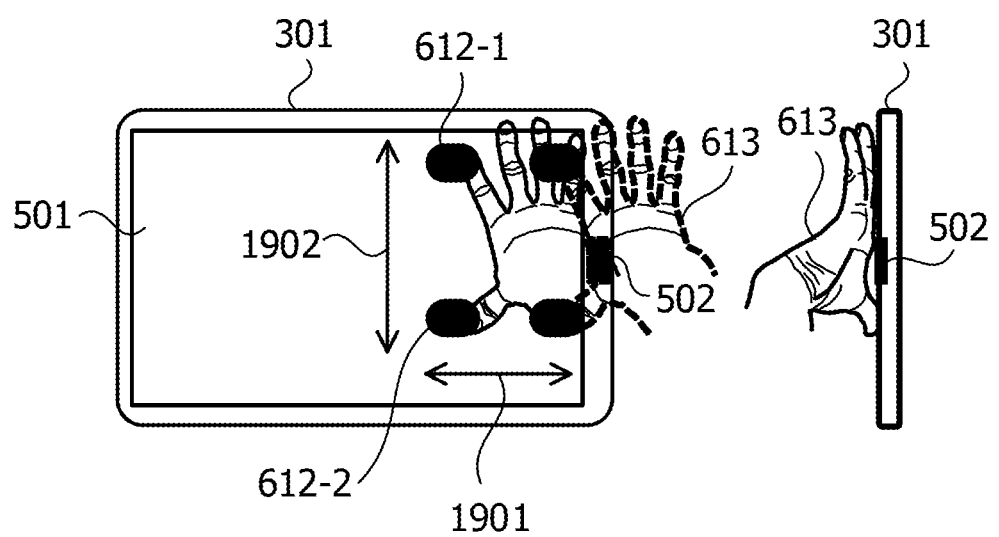
FIG. 19 is a diagram illustrating movement of a guidance figure.

FIG. 19 illustrates an example of movement of a guidance figure on the screen of the touch panel 501. On the screen of the touch panel 501, it is possible for the display positions of the mark 612-1 and the mark 612-2 included in the guidance figure to move in the horizontal direction as illustrated by an arrow 1901 and to move in the vertical direction as illustrated by an arrow 1902. In accordance with the movement of the display positions of the mark 612-1 and mark 612-2, the hand 613 that is in contact with those marks also moves in the horizontal direction or in the vertical direction.

For example, when biometric authentication is performed using the image of the central part of the palm, in order to detect more biometric information 526 from the biometric image 525, it is desirable that the central part of the palm is located just above the sensor 502. In this case, the display position of the guidance figure that guides the central part of the palm to just above the sensor 502 becomes the optimum position of the guidance figure.

Figure 20:
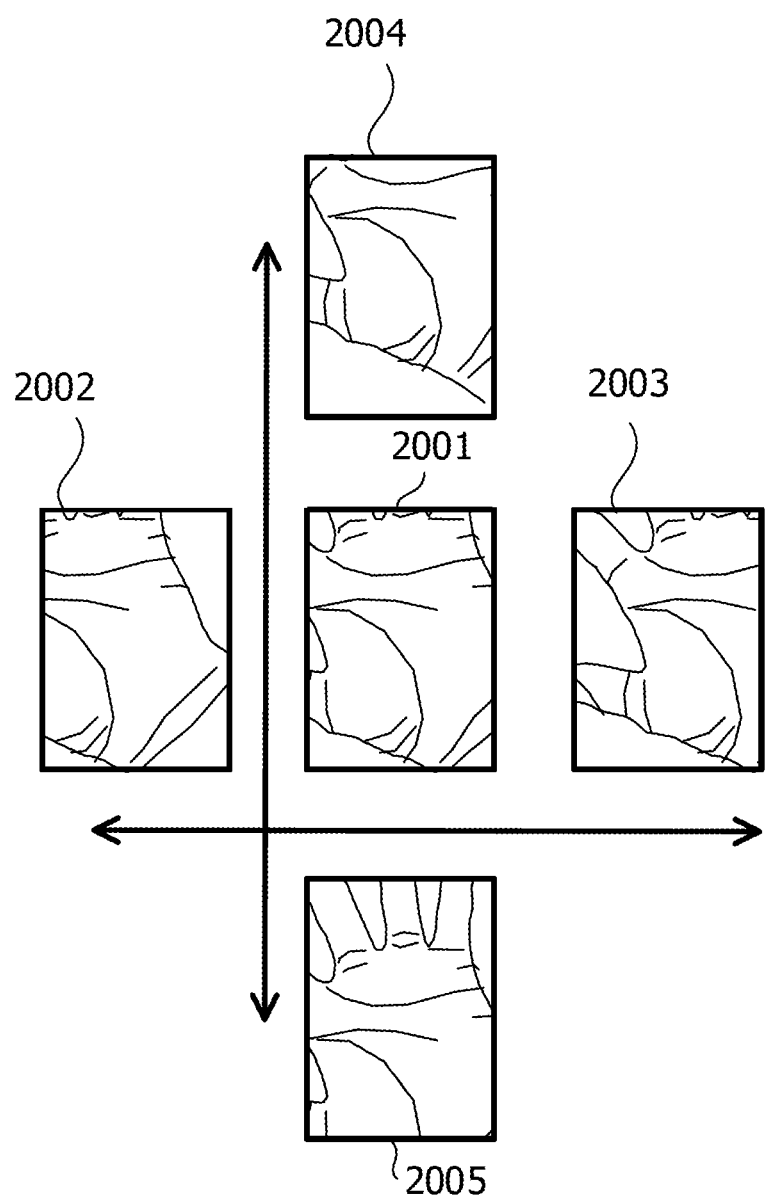
FIG. 20 is a diagram illustrating changes of a determination biometric image.

FIG. 20 illustrates an example of the determination biometric image 522 that changes in accordance with the movement of the guidance figure in FIG. 19. When the guidance figure is displayed at the optimum position, and the central part of the palm is located just above the sensor 502, a biometric image 2001 is obtained as the determination biometric image 522. On the other hand, when the display position of the guidance figure is shifted from the optimum position in the horizontal direction, a biometric image 2002 or a biometric image 2003 is obtained as the determination biometric image 522. When the display position of the guidance figure is shifted from the optimum position in the vertical direction, a biometric image 2004 or a biometric image 2005 is obtained as the determination biometric image 522.

The shapes of boundary lines between the palm and the background, which are taken in the biometric images, differ between the biometric image 2001 at the optimum position and the other biometric images 2002 to 2005, and thus the ratios of hand areas included in the biometric images also differ. Thus, it is possible for the position determination unit 513 to determine whether or not the display position of the guidance figure corresponds to the optimum position based on the ratio of a hand area included in the determination biometric image 522.

Figure 21:
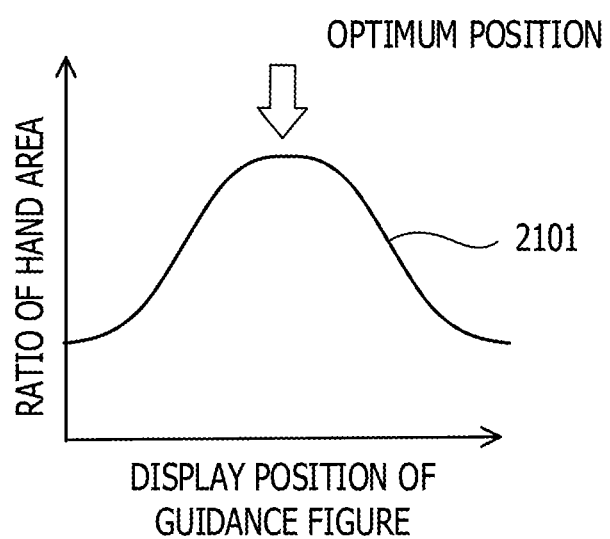
FIG. 21 is a diagram illustrating a change in the ratio of a hand area.

FIG. 21 illustrates an example of the ratio of a hand area, which changes in accordance with the movement of the guidance figure. The horizontal axis in FIG. 21 represents the display position of the guidance figure, and the vertical axis represents the ratio of the hand area included in the determination biometric image 522. The display position of the guidance figure is represented by a horizontal-direction coordinate (x-coordinate) on the screen or a vertical-direction coordinates (y-coordinate). If the display positions of the mark 612-1 and the mark 612-2 are moved in the horizontal direction or in the vertical direction, the ratio of the hand area changes as a curve 2101. In this case, the display position corresponding to a local maximum value of the ratio of the hand area is the optimum position.

In the determination biometric image 522, a pixel value in the hand area differs substantially from a pixel value in the background, and thus it is possible to obtain the ratio of the hand area, for example, by extracting an area having a predetermined pixel value as the hand area. In this case, it is possible for the feature detection unit 511 to detect the feature information 523 to be used for determining the display position of the guidance figure based on the distribution of the pixel values of the determination biometric image 522.

Figure 22:
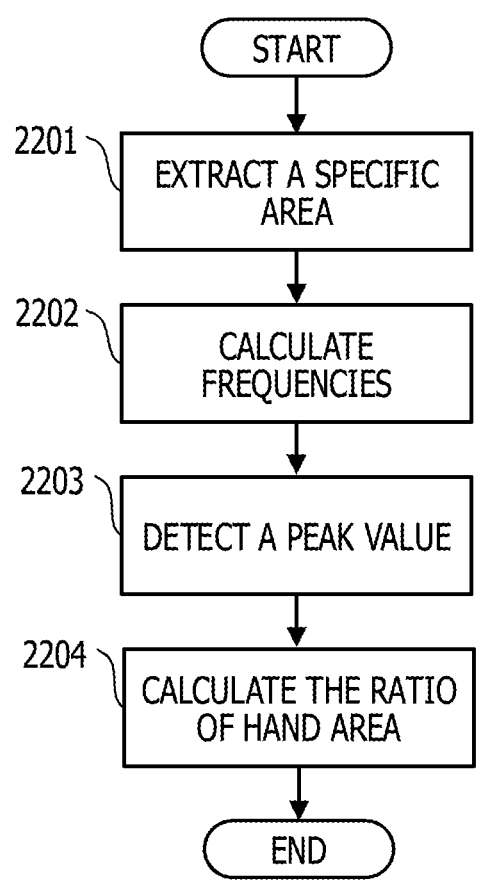
FIG. 22 is a flowchart of third feature detection processing.

FIG. 22 is a flowchart illustrating an example of third feature detection processing that detects the feature information 523 to be used for determining the display position of the guidance figure. The processing in step 2201 to step 2203 in FIG. 22 is identical to the processing in step 1201 to step 1203 in FIG. 12.

Next, the feature detection unit 511 calculates the ratio of the hand area with respect to a specific area using the peak value detected from the distribution of the pixel values (step 1204). For example, it is possible for the feature detection unit 511 to calculate the ratio R of the hand area by the following expression using the total number of pixels N0 of the specific area and the number of pixels N1 having a pixel value in a predetermined range including the peak value.
R=N1/N0 (1)

The ratio of the hand area detected by the feature detection processing in FIG. 22 is used in step 706 in FIG. 7 as the feature information 523. In this case, the position determination unit 513 compares the ratio of the hand area with a predetermined threshold value and determines whether or not the display position of the guidance figure is suitable for capturing the image of the palm based on the comparison result.

Figure 23:
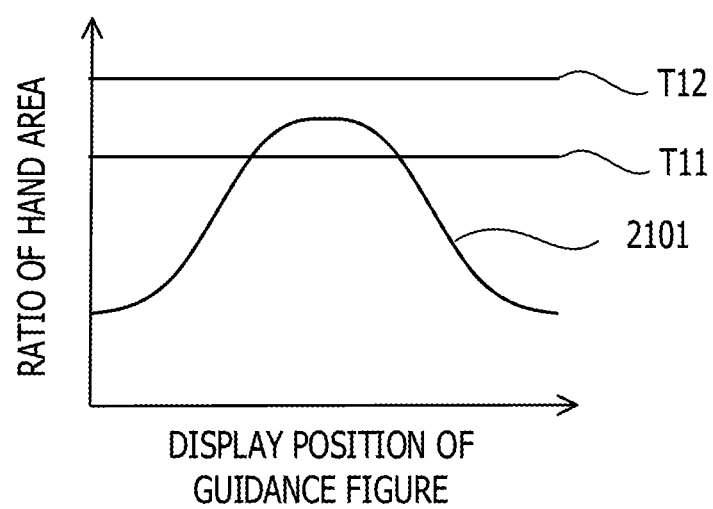
FIG. 23 is a diagram illustrating threshold values with respect to the ratio of a hand area.

FIG. 23 illustrates an example of threshold values with respect to the ratio of the hand area. A threshold value T11 indicates a low-frequency threshold value, and a threshold value T12 indicates a high-frequency threshold value. If the ratio of the hand area is equal to or higher than the threshold value T11 and the ratio rate of the hand area is lower than or equal to the threshold value T12, the position determination unit 513 determines that the display position of the guidance figure is suitable for capturing the image of the palm. If the ratio of the hand area is lower than the threshold value T11, or the ratio of the hand area is higher than the threshold value T12, the position determination unit 513 determines that the display position of the guidance figure is not suitable for capturing the image of the palm.

When biometric authentication is performed using the image of the central part of the palm, if the ratio of the hand area is equal to or higher than the threshold value T11, the position determination unit 513 may omit the determination using the threshold value T12 and determine that the display position of the guidance figure is suitable for capturing the image of the palm.

In this manner, it is possible to determine whether or not the display position is suitable without measuring the display position of the guidance figure by detecting the feature information 523 based on the distribution of the pixel values of the determination biometric image 522.

In step 714 in FIG. 7, it is possible for the change unit 514 to change the shape or the display position of the guidance figure that is represented by the guidance information 521. For example, if the guidance figure includes a mark that indicates the position to be in contact with a finger and a movement area that indicates an area in which the mark moves, the change unit 514 moves the mark by a predetermined amount in the movement area so as to change the guidance figure.

Figure 24A:
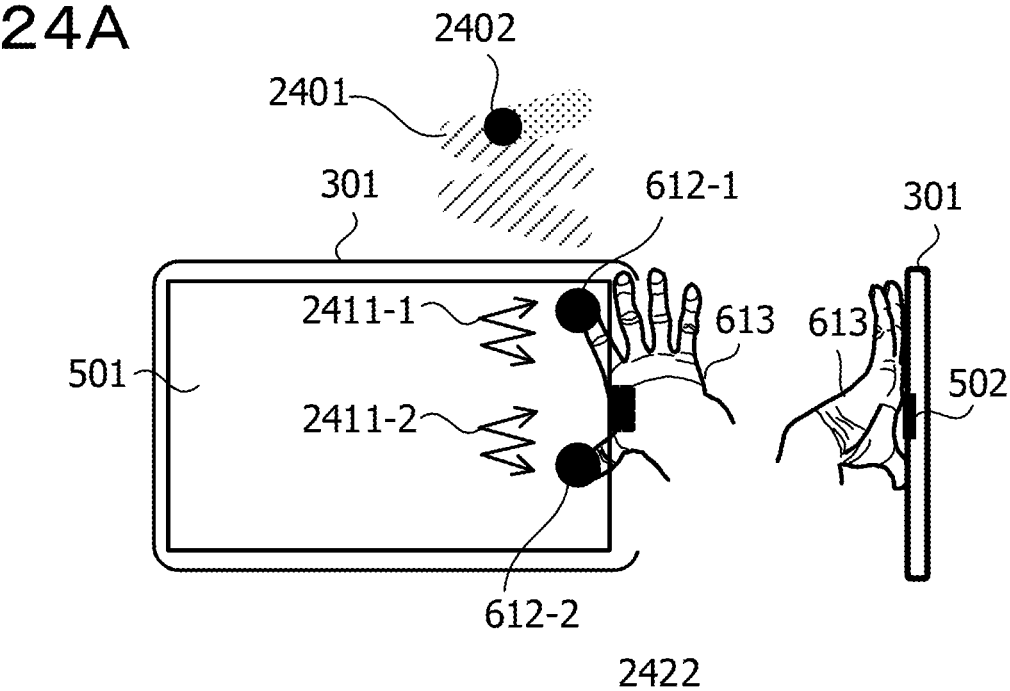
FIGS. 24A and 24B are diagrams illustrating a guidance figure.
Figure 24B:
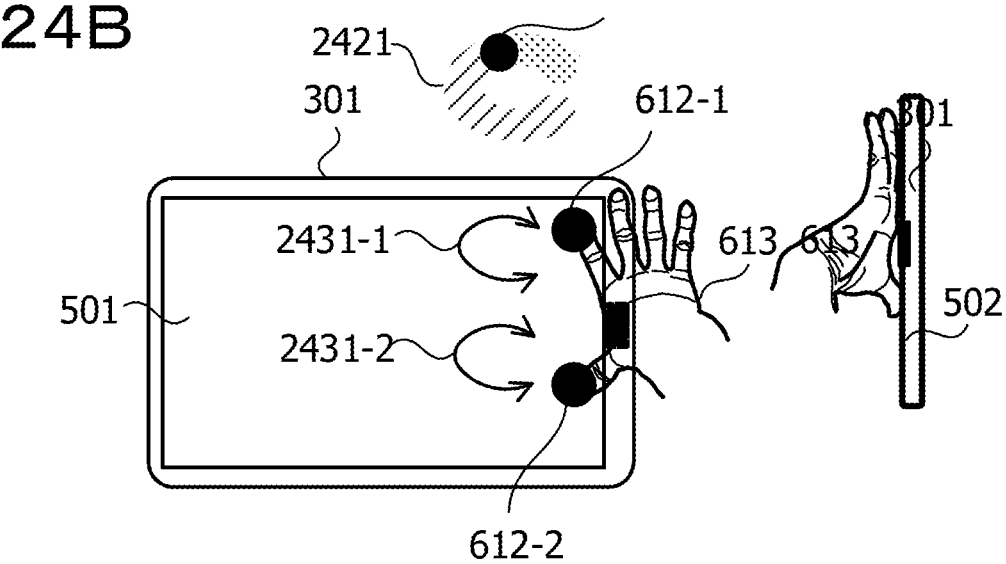

FIGS. 24A and 24B illustrate an example of the guidance figure including a mark and a movement area. FIG. 24A illustrates an example of the guidance figure including a movement area having a polygonal line shape. The guidance figure in FIG. 24A includes a mark 612-1 and a mark 612-2, and a movement area 2411-1 and a movement area 2411-2. The shapes of the movement area 2411-1 and the movement area 2411-2 may be the other shapes, which are combinations of a plurality of guide rails extending in the up-and-down and the left-and-right directions.

A movement area 2401 having a polygonal line shape represents an area produced by enlarging the movement area 2411-1 or the movement area 2411-2, and a mark 2402 that moves in the movement area 2401 corresponds to a mark 612-1 or a mark 612-2. In this case, the change unit 514 moves the mark 2402 in accordance with the shape of the movement area 2401 by a predetermined amount so as to prompt the user to change the contact position of the finger.

FIG. 24B illustrates an example of the guidance figure that includes a movement area having a curve shape. The guidance figure in FIG. 24B includes the mark 612-1 and the mark 612-2, and a movement area 2431-1 and a movement area 2431-2. The shape of the movement area 2431-1 and the movement area 2431-2 may be circular or elliptical.

The curve-shaped movement area 2421 indicates an enlarged area of the movement area 2431-1 or the movement area 2431-2, and a mark 2422 that moves in the movement area 2421 corresponds to the mark 612-1 or the mark 612-2. In this case, the change unit 514 moves the mark 2422 in accordance with the shape of the movement area 2421 by a predetermined amount so as to prompt the user to change the contact position of the finger.

Figure 25:
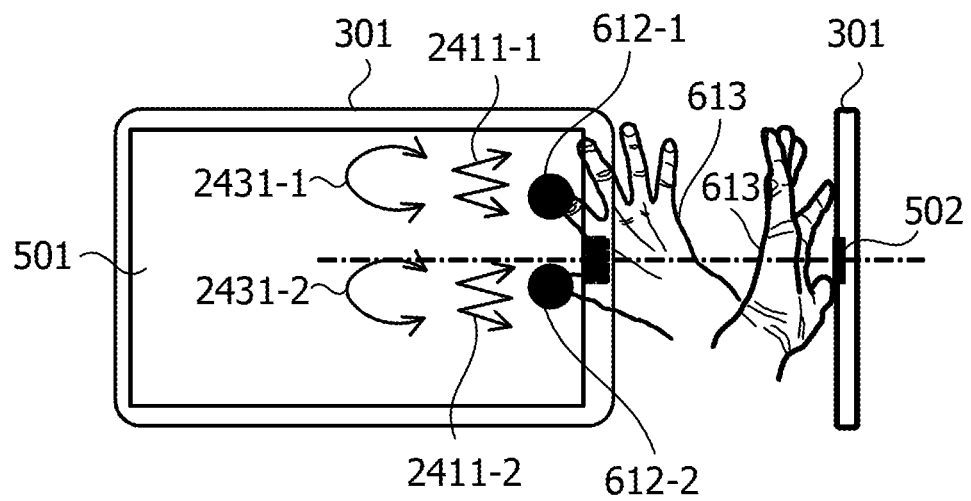
FIG. 25 is a diagram illustrating changes in the contact positions of fingers.

FIG. 25 illustrates an example of a change in the contact position of the finger when the guidance figure in FIG. 24 is used. By moving the mark 612-1 and the mark 612-2 in the movement area 2411-1 and the movement area 2411-2 respectively, the display positions of those marks are changed and the distance between the mark 612-1 and the mark 612-2 is also changed. Thereby, the contact position of the finger of the user and the shape of the hand 613 are changed, and thus the distance D between the sensor 502 and the palm is also changed.

In the same manner, when the mark 612-1 and the mark 612-2 are moved in the movement area 2431-1 and the movement area 2431-2 respectively, the contact positions of the fingers of the user and the shape of the hand 613 are changed, and thus the distance D is also changed.

In this manner, by repeating the processing for moving the mark 612-1 and the mark 612-2 by a predetermined amount, the display positions of the mark 612-1 and the mark 612-2 that are suitable for capturing the image of the palm are determined, and the optimum guidance information 524 is generated.

The guidance figure does not have to include a movement area and may include only the mark 612-1 and the mark 612-2. Instead of the change unit 514 determining the movement quantity of the mark 612-1 and the mark 612-2, it is possible for the user to determine the movement quantity of those marks.

In this case, in step 714, the user moves the contact position of the two respective fingers having in contact with the mark 612-1 and the mark 612-2 by a predetermined amount, and the change unit 514 changes the display positions of the mark 612-1 and the mark 612-2 in accordance with the movement of the contact positions. When the user performs such a change operation, a change in the contact position of the finger is reflected on the change of the distance D between the sensor 502 and the palm, and thus it is possible to determine the respective display positions of the mark 612-1 and the mark 612-2 that are suitable for capturing the image of the palm.

Further, the guidance figures do not have to include the mark 612-1 and the mark 612-2 and may be figures, such as rectangles, circles, or the like that indicate the target areas to be in contact with the two respective fingers. In this case, in step 714, the change unit 514 changes the shapes or the display positions of the guidance figures, and the user moves the contact positions of the two respective fingers on the screen in the changed guidance figures.

Figure 26:
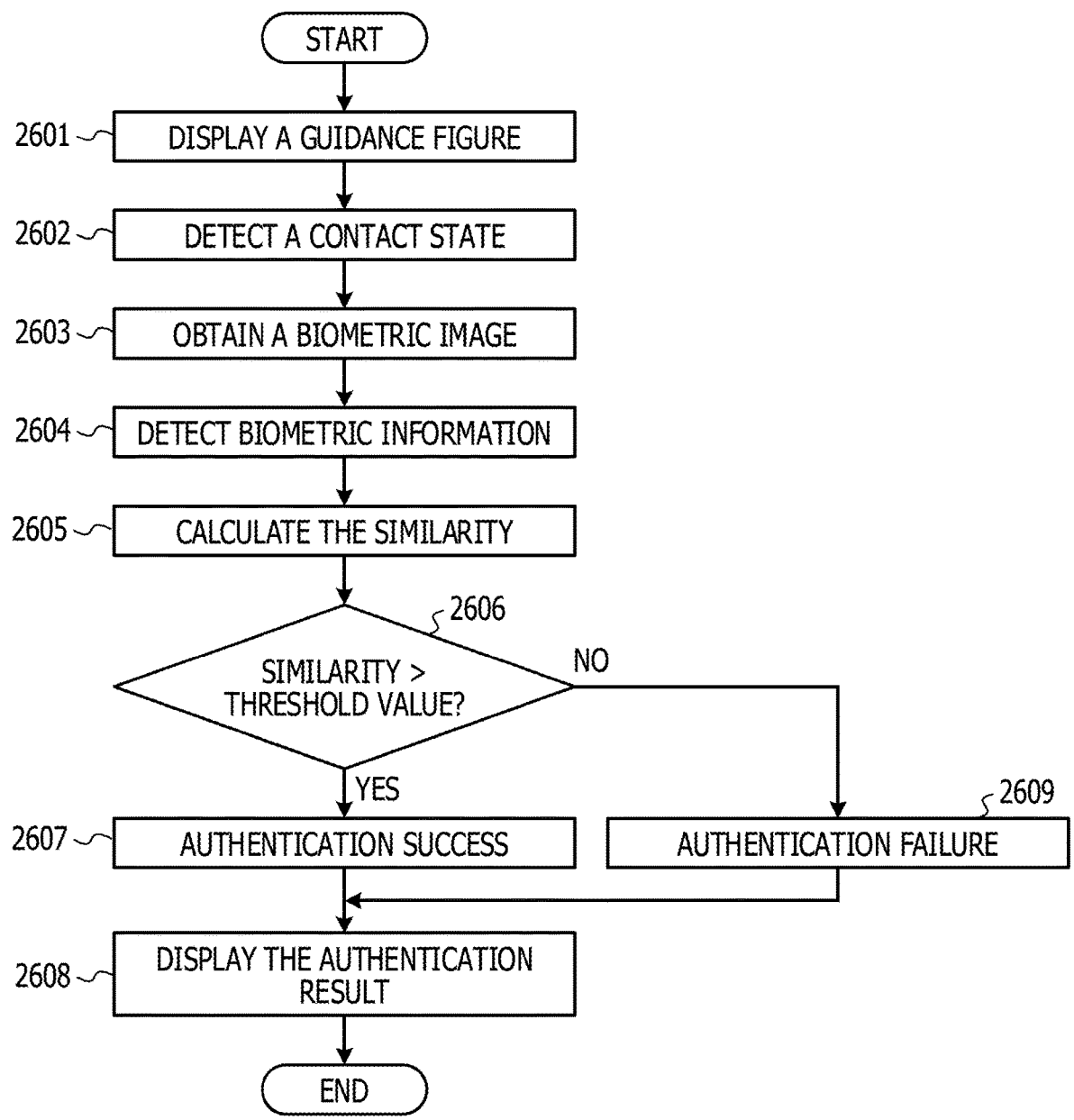
FIG. 26 is a flowchart of authentication processing.

FIG. 26 is a flowchart illustrating an example of the authentication processing performed by the biometric authentication apparatus 301 in FIG. 5. First, the display unit 311 displays the guidance figures represented by the optimum guidance information 524 on the screen (step 2601), and the detection unit 312 detects the contact state in which the two fingers of a person to be authenticated are in contact with the two respective points in the target area (step 2602). The imaging unit 313 captures the image of the palm in the detected contact state to obtain the biometric image 525 (step 2603).

Next, the biometric information detection unit 503 detects the biometric information 526 from the biometric image 525 (step 2604). The authentication unit 315 calculates the similarity between the biometric information 526 and the registration biometric information 527 (step 2605) and compares the similarity with a threshold value (step 2606).

If the similarity is higher than the threshold value (step 2606, YES), the authentication unit 315 determines as an authentication success (step 2607), and the display unit 311 displays an authentication result indicating the authentication success (step 2608). On the other hand, if the similarity is lower than or equal to the threshold value (step 2606, NO), the authentication unit 315 determines as an authentication failure (step 2609), and the display unit 311 displays an authentication result indicating an authentication failure (step 2608).

By the authentication processing in FIG. 26, the guidance figures are displayed in accordance with the optimum guidance information 524 generated by the registration processing in FIG. 7, and the image of the palm is captured in a state in which the distance D between the sensor 502 and the palm is suitable, and thus it is possible to obtain a clear biometric image of a person to be authenticated. Accordingly, the precision of the biometric information detected from the biometric image is improved, and the authentication precision of the biometric authentication using the biometric information is improved.

The configurations of the biometric authentication apparatus 301 in FIG. 3 and FIG. 5 are only examples, and a part of the components may be omitted or changed in accordance with the application or the condition of the biometric authentication apparatus 301. For example, in the biometric authentication apparatus 301 in FIG. 5, if the determination on the display positions of the guidance figures is not performed, it is possible to omit the position determination unit 513. If the distance between the sensor 502 and the palm is measured using a distance sensor, it is possible to omit the feature detection unit 511. The biometric authentication apparatus 301 does not have to be a mobile terminal device and may be an information processing apparatus that performs logon control or entrance and exit management, an ATM, or the like.

The flowchart in FIG. 4, FIG. 7, FIG. 8, FIG. 12, FIG. 22, and FIG. 26 are only examples, and a part of the processing may be omitted or changed in accordance with the configuration and the condition of the biometric authentication apparatus 301. For example, in the registration processing in FIG. 7, if the determination of the display positions of the guidance figures is not performed, it is possible to omit the processing of step 706. If the distance between the sensor 502 and the palm is measured by using a distance sensor, it is possible to omit the processing of step 703 and step 704.

In the feature detection processing in FIG. 8, the feature detection unit 511 may converts the image in a specific area into signals in the spatial frequency domain using the other transformation, such as the wavelet transformation, or the like instead of FFT.

In the authentication processing in FIG. 26, it is possible for the biometric authentication apparatus 301 to perform the determination of the distance D between the sensor 502 and the palm and the determination of the display positions of the guidance figures in the same manner as the registration processing. In this case, before the processing in step 2601, the same processing as the processing of step 701 to step 707 and step 714 is performed.

The guidance figures in FIG. 1, FIG. 2, FIG. 6, FIG. 18, FIG. 19, FIG. 24, and FIG. 25 are only examples, and the shapes of the guidance figures may be the other shapes. The specific area in FIG. 9 is only an example, and the shape of the specific area may be the other shape. The conversion result of the specific areas in FIG. 10 and FIG. 11 are only examples, and the conversion result of the specific area changes in accordance with the determination biometric image 522. The distributions of pixel values in FIG. 13 to FIG. 16 are only examples, and the distribution of pixel values changes in accordance with the determination biometric image 522.

The characteristic information of the imaging device in FIG. 17 is only an example, and the characteristic information of the imaging device changes in accordance with the optical characteristic of the imaging unit 313. The biometric image in FIG. 20 is only an example, and the biometric image changes in accordance with the position of the palm. The ratios of the hand areas in FIG. 21 and FIG. 23 are only examples and change in accordance with the determination biometric image 522. The biometric authentication apparatus 301 may perform the biometric authentication using the other biometric images instead of the biometric image of the hand.

Figure 27:
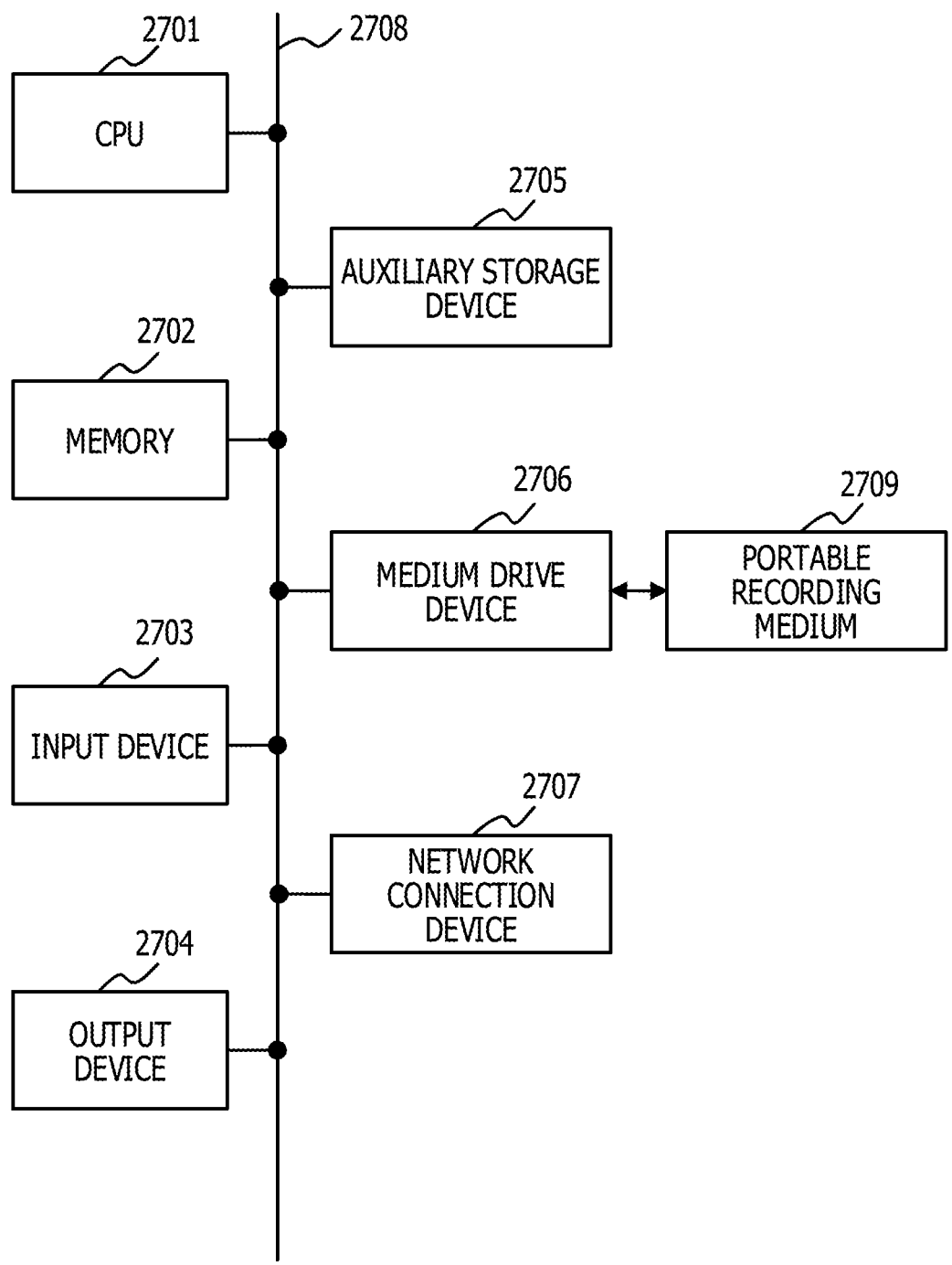
FIG. 27 is a configuration diagram of an information processing apparatus.

FIG. 27 illustrates an example of the configuration of an information processing apparatus (computer) to be used for the biometric authentication apparatus 301 in FIG. 3 and FIG. 5. The information processing apparatus in FIG. 27 includes a central processing unit (CPU) 2701, a memory 2702, an input device 2703, an output device 2704, an auxiliary storage device 2705, a medium drive device 2706, and a network connection device 2707. These components are mutually connected by a bus 2708. The sensor 502 in FIG. 5 may be connected to the bus 2708.

The memory 2702 is a semiconductor memory, for example, a read only memory (ROM), a random access memory (RAM), a flash memory, or the like and stores the program and the data used for the processing. It is possible to use the memory 2702 as the storage unit 504 in FIG. 5.

The CPU 2701 (processor) executes the program, for example, using the memory 2702 so as to operate as the determination unit 314 and the authentication unit 315 in FIG. 3 and FIG. 5. The CPU 2701 executes the program using the memory 2702 so as to operate as the biometric information detection unit 503, the feature detection unit 511, the distance determination unit 512, the position determination unit 513, and the change unit 514 in FIG. 5.

The input device 2703 is, for example, a keyboard, a pointing device, or the like and is used for inputting an instruction or information from an operator or a user. The output device 2704 is, for example, a display device, a printer, a speaker, or the like and is used for inquiring of the operator or the user or outputting a processing result. The touch panel 501 in FIG. 3 corresponds to a combination of the input device 2703 and the output device 2704, and it is possible to use the output device 2704 for the display unit 311. The processing result may be the authentication result.

The auxiliary storage device 2705 is, for example, a magnetic disk device, an optical disc device, a magneto-optical disk device, a tape device, or the like. The auxiliary storage device 2705 may be a flash memory or a hard disk drive. If the information processing apparatus is a mobile terminal device, it is possible to use a flash memory as the auxiliary storage device 2705. It is possible for the information processing apparatus to store the program and the data in the auxiliary storage device 2705, and load them into the memory 2702 to use them. It is possible to use the auxiliary storage device 2705 as the storage unit 504 in FIG. 5.

The medium drive device 2706 drives a portable recording medium 2709 and accesses the recording contents thereof. The portable recording medium 2709 may be a memory device, a flexible disk, an optical disc, a magneto-optical disk, or the like. The portable recording medium 2709 may be a Compact Disk read only memory (CD-ROM), a digital versatile disk (DVD), a Universal Serial Bus (USB) memory, or the like. If the information processing apparatus is a mobile terminal device, it is possible to use a memory card for the portable recording medium 2709. It is possible for the operator or the user to store the program and the data in the portable recording medium 2709 and load them into the memory 2702 to use them.

In this manner, a computer-readable recording medium that stores the program and the data to be used for the processing is a physical (non-transitory) recording medium, such as the memory 2702, the auxiliary storage device 2705, or the portable recording medium 2709.

The network connection device 2707 is a communication interface circuit that is connected to a communication network, such as a local area network, a wide area network, or the like, and performs data conversion involved in communication. It is possible for the information processing apparatus to receive the program and the data from an external device via the network connection device 2707 and load them into the memory 2702 to use them.

The information processing apparatus does not have to include all the components in FIG. 27, and it is possible to omit a part of the components in accordance with the application or the conditions. For example, if the information processing apparatus does not use the portable recording medium 2709 or the communication network, it is possible to omit the medium drive device 2706 or the network connection device 2707.

If the information processing apparatus is a mobile terminal device, the information processing apparatus may include a telephone communication device, such as a microphone and a speaker.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A biometric authentication apparatus comprising:
   an imaging device;
   a display device;
   a memory; and
   a processor coupled to the memory and the processor configured to
      display, on a screen of the display device, a guidance indicating a target area to be in contact with a part of a human body,
      detect whether the part of the human body is in contact with the target area,
      when the part of the human body is in contact with the target area, determine a distance between the imaging device and another part of the human body in accordance with an image captured by the imaging device, the image including the other part of the human body, and
      perform a change of a display position of the guidance in accordance with the determined distance,
   wherein the part of the human body is a plurality of fingers,
   the target area includes two areas to be in contact with respective two fingers, and
   the change includes changing a distance between the two areas.

2. The biometric authentication apparatus according to claim 1, wherein
   the change is executed when the determined distance is not suitable for capturing an image to be used biometric authentication.

3. The biometric authentication apparatus according to claim 1, wherein
   the distance is determined in accordance with a distribution of the frequency components of the image.

4. The biometric authentication apparatus according to claim 1, wherein
   the distance is determined in accordance with a distribution of pixel values of the image.

5. The biometric authentication apparatus according to claim 1, wherein
   the image includes a first image captured when the part of the human body is in a first position and a second image captured when the part of the human body is in a second position, and
   the distance is determined in accordance with a movement quantity between the first position and the second position, and a movement quantity between a biometric feature included in the first image and a biometric feature included in the second image.

6. The biometric authentication apparatus according to claim 1, wherein
   the image is at least one of an image of a palm, an image including a base of a thumb, and an image including a base of a little finger.

7. A computer-implemented biometric authentication method comprising:
- displaying, on a screen of a display device, a guidance indicating a target area to be in contact with a part of a human body;
- detecting whether the part of the human body is in contact with the target area;
- when the part of the human body is in contact with the target area, determining a distance between an imaging device and another part of the human body in accordance with an image captured by the imaging device, the image including the other part of the human body; and
- changing a display position of the guidance in accordance with the determined distance,
- wherein the part of the human body is a plurality of fingers,
- the target area includes two areas to be in contact with respective two fingers, and
- the changing includes changing a distance between the two areas.

8. The biometric authentication method according to claim 7, wherein
- the changing is executed when the determined distance is not suitable for capturing an image to be used biometric authentication.

9. The biometric authentication method according to claim 7, wherein
- the determining is executed in accordance with a distribution of the frequency components of the image.

10. The biometric authentication method according to claim 7, wherein
- the determining is executed in accordance with a distribution of pixel values of the image.

11. The biometric authentication method according to claim 7, wherein
- the image includes a first image captured when the part of the human body is in a first position and a second image captured when the part of the human body is in a second position, and
- the determining is executed in accordance with a movement quantity between the first position and the second position, and a movement quantity between a biometric feature included in the first image and a biometric feature included in the second image.

12. The biometric authentication method according to claim 7, wherein
- the image is at least one of an image of a palm, an image including a base of a thumb, and an image including a base of a little finger.

13. A non-transitory computer-readable medium storing a program that causes a biometric authentication apparatus to execute a process comprising:
- displaying, on a screen of a display device, a guidance indicating a target area to be in contact with a part of a human body;
- detecting whether the part of the human body is in contact with the target area;
- when the part of the human body is in contact with the target area, determining a distance between an imaging device and another part of the human body in accordance with an image captured by the imaging device, the image including the other part of the human body; and
- changing a display position of the guidance in accordance with the determined distance,
- wherein the part of the human body is a plurality of fingers,
- the target area includes two areas to be in contact with respective two fingers, and
- the change includes changing a distance between the two areas.

* * * * *